United States Patent [19]

Murphy et al.

[11] Patent Number: 4,661,756
[45] Date of Patent: Apr. 28, 1987

[54] SERVOMOTOR CONTROL SYSTEMS

[75] Inventors: John Murphy, Bishopstown; Francis McMullin, Ennis; Michael Egan, Wilton; Michael Brosnan, Ennis, all of Ireland

[73] Assignee: Kollmorgen Technologies Corporation, Dallas, Tex.

[21] Appl. No.: 789,095

[22] Filed: Oct. 18, 1985

[30] Foreign Application Priority Data

Oct. 19, 1984 [IE] Ireland ................................ 2698/84
Apr. 16, 1985 [IE] Ireland .................................. 958/85

[51] Int. Cl.⁴ ........................ H02K 19/24; H02P 7/40
[52] U.S. Cl. .................................. 318/701; 318/138; 318/685; 318/700; 318/168
[58] Field of Search ..................... 318/40, 138, 254 A, 318/254, 436, 439, 696, 700, 701, 677, 681, 685; 310/168

[56] References Cited

U.S. PATENT DOCUMENTS

| | | | |
|---|---|---|---|
| 3,062,979 | 11/1962 | Jarret et al. | 310/168 |
| 3,171,049 | 2/1965 | Jarret et al. | 310/168 |
| 3,305,717 | 2/1967 | Weiss | 318/254 |
| 3,521,098 | 7/1970 | Jesse | 310/163 |
| 3,714,533 | 1/1973 | Unneweki | 318/138 X |
| 3,743,906 | 7/1973 | Torok | 318/254 |
| 3,750,000 | 7/1973 | Bruckner et al. | 318/696 |
| 3,909,693 | 9/1975 | Yoshitake et al. | 318/696 |
| 3,919,608 | 11/1975 | Usami et al. | 318/138 |
| 3,956,678 | 5/1976 | Byrne et al. | 318/138 |
| 3,979,651 | 9/1976 | Bringol | 318/138 |

(List continued on next page.)

FOREIGN PATENT DOCUMENTS

| | | |
|---|---|---|
| 0096390 | 12/1983 | European Pat. Off. . |
| 1151037 | 5/1969 | United Kingdom . |
| 1175512 | 12/1969 | United Kingdom . |
| 1343954 | 1/1974 | United Kingdom . |
| 1439991 | 6/1976 | United Kingdom . |
| 1525384 | 9/1978 | United Kingdom . |
| 1579121 | 11/1980 | United Kingdom . |
| 2105933A | 3/1983 | United Kingdom . |

OTHER PUBLICATIONS

WO 83/00957 PCT.
Industrial Switched Reluctance Drives—Concepts & Performance—Ray Lawrenson et al., IEE International Conference on Power Electronics & Variable Speed Drives—May 1984, pp. 357-360.
Progress on the Development of a 60 Kw Variable-Reluctance Motor Drive for Electric Vehicle Propulsion—Torrey & Lang of MIT, at Motor-con. Oct. 1985.
Switched Reluctance Motors for Traction Drives—Ray Lawrenson et al., at International Conference on Electrical Machines in Athens—Sep. 1980.
A High Performance Variable Reluctance Drive: A New Brushless Servo—at Motor-Con—Oct. 1985, pp. 147-160.
Low-Cost, Reluctance Drive System for Low Power, Low Speed Application—Bolton & Pedder—IEE Conference on Variable Speed Drives—Sep. 1979.
Electric Machinery—Fitzgerald et al.,—Third Edition; McGraw-Hill 1961 pp. 506-509.
Electrical Machines and Their Applications—Second Edition; Hindmarsh, Pergamon 1970—pp. 536-539.
IEE Conference Publication, vol. 136, 1976 pp. 93 to 96—Byrne & Lacey.
Microprocessor Control of a Variable Reluctance Motor—Chappell et al.—IEE Proceedings, vol. 131, Pt.B. No. 2, Mar. 1984, pp. 51 to 60.

Primary Examiner—William M. Shoop, Jr.
Assistant Examiner—Bentsu Ro
Attorney, Agent, or Firm—Morgan & Finnegan

[57] ABSTRACT

In a servo control system for a reluctance motor, the output of a reference waveform generator is applied to a power converter through a current controller. Under standstill conditions, at least two of the motor windings are energised so that both forward and reverse torques are established, the forward torque being in equilibrium with the reverse torque. The controller may be responsive to a bias signal to establish said torques. The control system may form part of a reluctance motor drive system.

30 Claims, 25 Drawing Figures

U.S. PATENT DOCUMENTS

| | | | |
|---|---|---|---|
| 3,980,933 | 9/1976 | Piatowski | 318/138 |
| 4,059,790 | 11/1977 | Kennel | 318/436 X |
| 4,093,905 | 6/1978 | von Braun | 318/696 |
| 4,107,594 | 8/1978 | Jacobs | 318/685 |
| 4,121,145 | 10/1978 | Talmadge | 318/696 |
| 4,136,308 | 1/1979 | King | 318/696 |
| 4,143,308 | 3/1979 | Deplante et al. | 318/138 |
| 4,145,644 | 3/1979 | Liu | 318/696 |
| 4,214,194 | 7/1980 | Horning | 318/696 |
| 4,223,261 | 9/1980 | White | 318/313 X |
| 4,284,940 | 8/1981 | Welburn | 318/696 |
| 4,306,181 | 12/1981 | Welburn | 318/696 |
| 4,368,411 | 1/1983 | Kidd | 318/341 X |
| 4,447,771 | 5/1984 | Whited | 318/254 X |
| 4,454,458 | 6/1984 | Holland | 318/439 X |
| 4,455,520 | 6/1984 | Ward et al. | 318/696 |

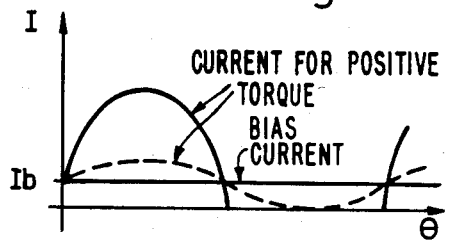
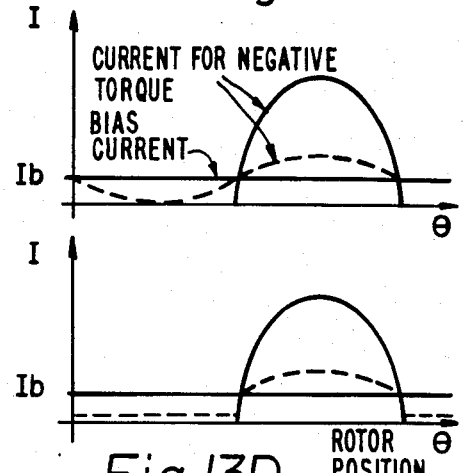
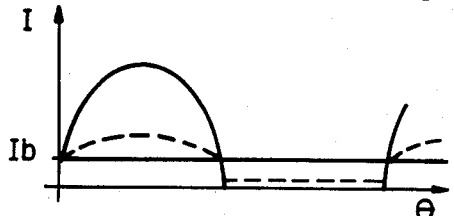
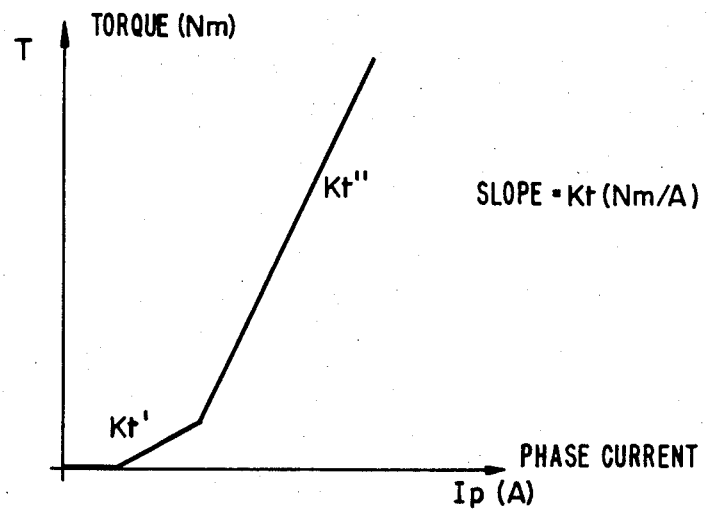

—— POSITIVE TORQUE CURRENT
------ NEGATIVE TORQUE CURRENT

SERVOMOTOR CONTROL SYSTEMS

BACKGROUND OF THE INVENTION

Field of the Invention

This invention relates to drive systems for saturable variable reluctance electrical machines. In particular, the present invention relates to drive and control systems permitting servomotor performance and characteristics to be achieved from a variable or switched reluctance motor, and also relates to control features useful in self-contained control systems not necessarily comprising a variable reluctance motor, but applicable to a variety of such motors. The invention is especially directed to control systems for motors incorporating the features of co-pending patent application Ser. No. 789,038 entitled "Variable Speed Variable Reluctance Electrical Machines", as well as to control systems for drives incorporating motors having these features.

According to a first aspect of said co-pending application, there is provided a drive system comprising a saturable variable reluctance electrical motor, said motor comprising a stationary or driving member having a plurality of salient driving poles, a magnetizing winding for each driving pole, and a movable or driven member having a plurality of salient driven poles, the number of driven poles being less than the number of driving poles, and a plurality of airgaps, the airgap between each driving pole and a driven pole positioned in alignment therewith being small relative to the dimensions of the poles transverse to said airgap and at least the driven poles being formed so that in operation of the motor magnetic saturation occurs substantially in the region of the mechanically variable interface or overlap between the driving and driven poles, and the extents and dispositions of the driven poles being related to those of the driving poles so that in operation of the motor the force-producing increment of driven member displacement resulting from the mechanical interface or overlap of each driven pole with a driving pole overlaps the force-producing increment of driven member displacement resulting from the overlap of another driven pole with a further driving pole, and the system also comprising driven member position-sensing means for generating at least one signal, the instantaneous value of which is dependent on the position of the driven member, and power supply means including a voltage source or sources connectible across the driving pole windings, said windings being connectible across said source or a said source in a predetermined sequence during driven member displacement and each driving pole winding being thus connectible for a predetermined increment of driven member displacement, and the power supply means also including means for regulating the instantaneous magnitude of the current in a driving pole winding when connected to said source or a said source, said current-regulating means being responsive to the or a said driven member position-dependent signal of the driven-member position-sensing means to regulate said current magnitude so that the instantaneous value of said current set by said regulating means at any position of the driven member within said increment of driven member displacement during which the winding is connectible to said source or a said source relative to its value at any other said position is substantially determined by the instantaneous position of the driven member.

In a rotary construction, said stationary or driving member is a stator and said driving poles are stator poles, said movable or driven member is a rotor and said driven poles are rotor poles, while said driven member displacement is represented by rotation of the rotor.

In another aspect, this co-pending application discloses a saturable variable reluctance electrical machine comprising a stationary or driving member having a plurality of salient driving poles, a winding for each driving pole, a movable or driven member having a plurality of driven poles, the number of driven poles being less than the number of driving poles, the airgap between each driving pole and a driven pole positioned in alignment therewith being small relative to the dimensions of the poles transverse to said airgap and at least the driven poles being formed so that in operation of the machine magnetic saturation occurs substantially in the region of the mechanically variable interface or overlap between the driving and driven poles, the extents and dispositions of the driven poles being related to those of the driving poles so that in operation of the machine the force-producing increment of driven member displacement resulting from the mechanical interface or overlap of each driven pole with a driving pole overlaps the force-producing increment of driven member displacement resulting from the overlap of another driven pole with a further driving pole, each driven pole and each driving pole having edge regions spaced apart in the direction of relative displacement of the driven and driving members, said spacing of said edge regions being substantially constant throughout the extent of the pole in a direction transverse to said direction of relative displacement and each said edge region being defined in said transverse direction of the pole by a succession of edge region portions, each said edge region portion being displaced in said direction of relative displacement with respect to the or each adjacent edge region portion of said edge region, each said edge region portion being advanced in said direction of relative displacement with respect to the preceding edge region portion of each said edge region portion being set back in said direction of relative displacement with respect to the preceding edge region portion so that said edge region is skewed relative to said direction of relative displacement, and the spacing in said direction of relative displacement between the edge region portion at one transverse end of one of said edge regions of the pole and that at the other transverse end of the same edge region being between one quarter of the constant extent of the pole in said direction of relative displacement and a value equal to said extent.

In a rotary construction, said stationary or driving member is a stator and said driving poles are stator poles, said movable or driven member is a rotor and said driven poles are rotor poles, and said driven member displacement is represented by rotation of the rotor, while said transverse direction is a direction parallel to the axis of rotation.

BRIEF SUMMARY OF THE INVENTION

It is an object of the present invention to provide advantageous realizations of features of the drive systems of said co-pending Application while it is a further object of the present invention to provide a drive system permitting servomotor performance characteristics to be achieved from a variable or switched reluctance motor. These characteristics may include (i) wide bidirectional speed range (ii) smooth low-speed performance
(iii) static shaft stiffness with zero deadband and
(iv) rapid full-speed reversal.

According to the invention, there is provided a control system for a variable reluctance electrical machine, comprising means for connecting a voltage source or sources across driving member pole windings of a said machine in a predetermined sequence and for a predetermined increment of displacement of a driven member of the machine, said means being adapted to connect at least two of said windings across said source or a said source at least under standstill conditions, so that a forward force is established by the overlap of a driven pole with at least one driving pole, the winding of which is thus connected and a reverse force is established by the overlap of a further driven pole with at least one other of the driving poles, the winding of which is also thus connected, and said forward force is in substantial equilibrium with said reverse force under said conditions.

The control system according to the invention may comprise means for connecting a voltage source or sources across stator pole windings of a said machine in a predetermined sequence and for a predetermined angular increment of rotation of the rotor of the machine, said means being adapted to connect at least two of said windings across said source or a said source at least under standstill conditions so that a forward torque is established by the overlap of a rotor pole with at least one stator pole, the winding of which is thus connected, and a reverse torque is established by the overlap of a further rotor pole with at least one other of the stator poles, the winding of which is also thus connected, and said forward torque is in substantial equilibrium with said reverse torque under said conditions.

Accordingly under standstill or zero-speed conditions, a forward torque is exerted by virtue of the excitation of certain selected phases and this is complemented by a reverse or counter-torque established by the energization of further phases, the net result being an equilibrium of torques acting on the motor shaft, so that the shaft remains stationary and resists any forces tending to rotate it.

The control system according to the invention provides the required static stiffness at standstill by establishing opposed torques in the windings of the motor. At low motor speeds, a similar torque balancing effect provides very precise control of shaft speed, in that a counter-torque immediately opposes any tendency of the motor to over-speed. These advantages have been found to accrue by use of the control system according to the invention in reluctance motor drive systems, while smooth and quiet operation of the motor may also be achieved.

The control system may also include means for regulating the instantaneous magnitude of the current in a stator winding of a said machine when connected to said source or a said source, said current-regulating means being responsive to a rotor-position dependent signal generated by rotor-position sensing means associated with the machine to regulate said current magnitude so that the instantaneous value of said current set by said regulating means at any angular position of the rotor within said angular increment of rotor rotation during which the winding is connectible to said source or a said source relative to its value at any other said angular position is substantially determined by the instantaneous angular position of the rotor.

Said current-regulating means may also include memory means for storing digitised relative current magnitudes for each of a plurality of positions of the rotor for recall in appropriate sequence in accordance with the instantaneous value of the or a said rotor position-dependent signal of the rotor position-sensing means.

The current-regulating means may also be responsive to a bias signal for connecting at least two said windings across said source or a said source, at least under standstill conditions, for any position of the rotor, so that said forward torque established under said conditions by the overlap of a rotor pole with at least one stator pole, the winding of which is thus connected, is in substantial equilibrium with said reverse torque similarly established by the overlap of a further rotor pole with at least one other of the stator poles, the winding of which is also thus connected.

The control system according to the invention may further comprise means for producing a signal, the value of which is indicative of a desired parameter of machine operation, said current-regulating means also being responsive to said parameter-indicative signal to regulate said stator winding current so that the absolute magnitude of said current at every angular position of the rotor within said angular increment of rotor rotation during which the winding is connectible to said voltage source or a said voltage source is substantially determined by the value of said parameter-indicative signal. The system may in addition comprise means for associating said bias signal with said parameter-indicative signal.

According to a further aspect of the invention, there is provided a drive system comprising a saturable variable reluctance electrical machine, said electrical machine comprising a stationary or driving member having a plurality of salient driving poles, a magnetising winding for each driving pole, a movable or driven member having a plurality of salient driven poles, the number of driven poles being less than the number of driving poles, the airgap between each driving pole and a driven pole positioned in alignment therewith being small relative to the dimensions of the poles transverse to said airgap and at least the driven poles being formed so that in operation of the machine magnetic saturation occurs substantially in the region of the mechanically variable interface or overlap between the driving and driven poles, and the extents and dispositions of the driven poles being related to those of the driving poles so that in operation of the machine the force-producing increment of driven member displacement resulting from the mechanical interface or overlap of each driven pole with a driving pole overlaps the force-producing increment of driven member displacement resulting from the overlap of another driven pole with a further driving pole, and the system also comprising driven member position-sensing means for generating at least one signal, the instantaneous value of which is dependent on the position of the driven member, and power supply means including a voltage source or sources connectible across the driving pole windings, said windings being connectible across said source or a said source in a predetermined sequence during driven member displacement and each driving pole winding being thus connectible for a predetermined increment of driven member displacement, and at least two of said windings being connectible across said source or a said source at least under standstill conditions so that a forward force is established by the overlap of a driven pole with at least one driving pole, the winding of which is thus connected, and a reverse force is established by the overlap of a further driven pole with at least one other of the driving poles, the winding of which is also thus connected, and said forward force is in substantial equilibrium with said reverse force under said conditions.

In rotary construction, the drive system according to the invention may comprise a saturable variable reluctance electrical machine, said electrical machine comprising a stator having a plurality of salient stator poles, a magnetizing winding for each stator pole, a rotor having a plurality of salient rotor poles, the number of rotor poles being less than the number of stator poles, the radial airgap between each stator pole and a rotor pole positioned in alignment therewith being small relative to the dimensions of the poles transverse to said airgap and at least the rotor poles being formed so that in operation of the machine magnetic saturation occurs substantially in the region of the mechanically variable interface or overlap between the stator and rotor poles, and the arcuate extents and dispositions of the rotor poles being related to those of the stator poles so that in operation of the machine the torque-producing angular increment of rotor rotation resulting from the mechanical interface or overlap of each rotor pole with a stator pole overlaps the torque-producing angular increment of rotor rotation resulting from the overlap of another rotor pole with a further stator pole, and the system also comprising rotor position-sensing means for generating at least one signal, the instantaneous value of which is dependent on the angular position of the rotor, and power supply means including a voltage source or sources connectible across the stator pole windings, said windings being connectible across said source or a said source in a predetermined sequence during rotor rotation and each stator pole winding being thus connectible for a predetermined angular increment of rotor rotation, and at least two of said windings being connectible across said source or a said source at least under standstill conditions so that a forward torque is established by the overlap of a rotor pole with at least one stator pole, the winding of which is thus connected, and a reverse torque is established by the overlap of a further rotor pole with at least one other of the stator poles, the winding of which is also thus connected, and said forward torque is in substantial equilibrium with said reverse torque under said conditions.

The power supply means for the drive system of the invention may also include means for regulating the instantaneous magnitude of the current in a stator winding when connected to said source or a said source, said current-regulating means being responsive to the or a said rotor position-dependent signal of the rotor position-sensing means to regulate said current magnitude so that the instantaneous value of said current set by said regulating means at any angular position of the rotor within said angular increment of rotor rotation during which the winding is connectible to said source or a said source relative to its value at any other said angular position is substantially determined by the instantaneous angular position of the rotor.

In another aspect, there is provided according to the invention, a drive system comprising a saturable variable reluctance electrical machine, said electrical machine comprising a stationary or driving member having a plurality of salient driving poles, a magnetizing winding for each driving pole, a movable or driven member having a plurality of salient driven poles, the number of driven poles being less than the number of driving poles, the airgap between each driving pole and a driven pole positioned in alignment therewith being small relative to the dimensions of the poles transverse to said airgap and at least the driven poles being formed so that in operation of the machine magnetic saturation occurs substantially in the region of the mechanically variable interface or overlap between the driving and driven poles, and the extents and dispositions of the driven poles being related to those of the driving poles so that in operation of the machine the force-producing increment of driven member displacement resulting from the mechanical interface or overlap of each driven pole with a driving pole overlaps the force-producing increment of driven member displacement resulting from the overlap of another driven pole with a further driving pole, and the system also comprising driven member position-sensing means for generating at least one signal, the instantaneous value of which is dependent on the position of the driven member, and power supply means including a voltage source or sources connectible across the driving pole windings, said windings being connectible across said source or a said source in a predetermined sequence during driven member displacement and each driving pole winding being thus connectible for a predetermined increment of driven member displacement, and the power supply means also including means for regulating the instantaneous magnitude of the current in a driving member winding when connected to said source or a said source, said current-regulating means being responsive to the or a said driven member position-dependent signal of the driven-member position-sensing means to regulate said current magnitude so that the instantaneous value of said current set by said regulating means at any position of the driven member within said increment of driven member displacement during which the winding is connectible to said source or a said source relative to its value at any other said position is substantially determined by the instantaneous position of the driven member, and said current-regulating means also including memory means for storing digitised relative current magnitudes for each of a plurality of positions of the driven member for recall in appropriate sequence in accordance with the instantaneous value of the or a said driven-member position-dependent signal of the driven-member position-sensing means.

In a rotary construction according to this aspect of the invention, the drive system may comprise a saturable variable reluctance electrical machine, said electrical machine comprising a stator having a plurality of salient stator poles, a magnetizing winding for each stator pole, a rotor having a plurality of salient rotor poles, the number of rotor poles being less than the number of stator poles, the radial airgap between each stator pole and a rotor pole positioned in alignment therewith being small relative to the dimensions of the pole transverse to said airgap and at least the rotor poles being formed so that in operation of the machine magnetic saturation occurs substantially in the region of the mechanically variable interface or overlap between the stator and rotor poles, and the arcuate extents and dispositions of the rotor poles being related to those of the stator poles so that in operation of the machine the torque-producing angular increment of rotor rotation resulting from the mechanical interface or overlap of each rotor pole with a stator pole overlaps the torque-producing angular increment of rotor rotation resulting from the overlap of another rotor pole with a further stator pole, and the system also comprising rotor position-sensing means for generating at least one signal, the instantaneous value of which is dependent on the angular position of the rotor, and power supply means including a voltage source or sources connectible across the stator pole windings, said windings being connectible across said source or a said source in a predetermined sequence during rotor rotation and each stator pole winding being thus connectible for a predetermined angular increment of rotor rotation, and the power supply means also including means for regulating the instantaneous magnitude of the current in a stator winding when connected to said source or a said source, said current-regulating means being responsive to the or a said rotor position-dependent signal of the rotor position-sensing means to regulate said current magnitude so that the instantaneous value of said current set by said regulating means at any angular position of the rotor within said angular increment of rotor rotation during which the winding is connectible to said source or a said source relative to its value at any other said angular position is substantially determined by the instantaneous angular position of the rotor, and said current-regulating means also including memory means for storing digitized relative current magnitudes for each of a plurality of positions of the rotor for recall in appropriate sequence in accordance with the instantaneous value of the or a said rotor position-dependent signal of the rotor position-sensing means. The current-regulating means may also be responsive to a bias signal for connecting at least two of said windings across said source or a said source, at least under standstill conditions, for any position of the rotor, so that forward torque is established by the overlap of a rotor pole with at least one stator pole, the winding of which is thus connected, and reverse torque is established by the overlap of a further rotor pole with at least one other of the stator poles, the winding of which is also thus connected, and said forward torque is in substantial equilibrium with said reverse torque under said conditions.

The drive system according to the invention may further comprise means for producing a signal, the value of which is indicative of a desired parameter of machine operation, said current-regulating means also being responsive to said parameter-indicative signal to regulate said stator winding current so that the absolute magnitude of said current at every angular position of the rotor within said angular increment of rotor rotation during which the winding is connectible to said voltage source or a said voltage source is substantially determined by the value of said parameter-indicative signal. The drive system may also comprise means for associating said bias signal with said parameter-indicative signal.

According to further features of our said co-pending Application, the or each position-dependent signal of the rotor-position sensing means may be a waveshape of appropriate configuration, such as a sinewave, and its instantaneous magnitude at each rotor position used to establish an appropriate relative value for the winding current. In an analog realization of the current-regulating means, the position-dependent signal or signals of the rotor position sensing means may be modified to provide one or more waveshapes of the desired configuration or said waveshape or waveshapes may be derived from said signal or signals by suitable analog circuit means.

It will be appreciated that features comparable with arrangements in rotary embodiments of the invention may be provided in non-rotary or linear constructions.

BRIEF DESCRIPTION OF THE DRAWINGS

Embodiments of drive systems incorporating the principles of the present invention are now described having regard to the accompanying drawings, in which:

FIGS. 13A, 13B, 13C and 13D show alternative implementations for d.c. bias of VRM windings for zero torque demand, and excitation of the windings by sinusoidal halfwaves with increasing torque demand, FIG. 14 is a diagrammatic plot of torque as a function of phase current with d.c. bias.

DETAILED DESCRIPTION OF THE DRAWINGS

Figure 1:
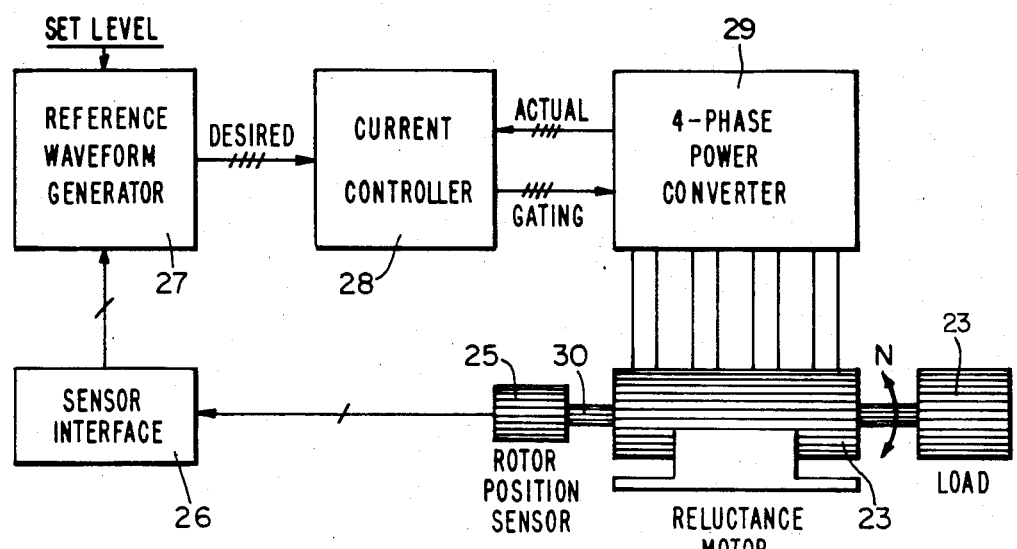
FIG. 1 is a block diagram of a variable reluctance motor drive system according to the invention.

A variable reluctance motor drive system embodying the principles of the present invention is shown in FIG. 1. This Figure corresponds to FIG. 12 of said co-pending patent application entitled "Variable Speed Variable Reluctance Electrical Machines". A four-phase reluctance motor 23 drives a load 24 and has a rotor position sensor 25 associated with its shaft 30. The sensor may be for example an encoder generating one or more streams of pulses which are electronically processed to provide shaft position information at a succession of angular intervals. Appropriate logic is employed to permit determination of the direction of rotation and a zero marker is also provided. A reference waveform generator 27 uses position information from the sensor 25, modified as required by sensor interface 26, to provide, as an output, a signal indicative of the value of current required in each phase for each angular position of the shaft to achieve a desired shape of phase torque. The generator 27 has a further "set level" input adjustable by a controller or monitoring means, for determining the actual value of the torque to be generated, subject to the shape constraints also called for by the generator. As illustrated in this Figure and as discussed in the following description of the Figure, the system has only an inner torque loop, but in a typical practical construction, such as is subsequently shown and described, an outer speed control loop is also provided, the torque then being adjusted or controlled to meet a set speed signal in operation of the system. The output signal from the generator 27, of a value determined by the combination of rotor position signal and set level input, is applied to a current controller 28, which provides an output signal for each of the four phases of the motor in the form of a reference current waveshape. These reference waveshapes then provide gating signals or inputs to a power converter 29 in which the actual phase currents of the motor are forced to track the reference current waveforms. For this purpose a signal indicative of the actual current in each phase is fed back to the current controller, so that the gating signal forwarded to the converter from the controller 28 serves to produce the required phase current.

The waveform generator 27 and the current controller 28 together form current magnitude regulating means by which the relative instantaneous value of the exciting current in each stator winding at every rotor position can be controlled so that the energizing current will have a waveshape suitable for achieving the phase torques desired during operation of the motor for smooth torque transitions between phases and minimization of "hammer-blow". The current may be constrained to follow a predetermined wave-shape by the use of digitized relative current magnitudes stored in memory means of the system and recalled in appropriate sequential order in reponse to rotor position as indicated by sensor 25. In this embodiment of the invention, the digitized magnitudes may follow any desired waveshape, and in particular they may be such that the current waveshape produced by the controller will be substantially a half sinewave. A detailed description of such an embodiment of the invention follows in relation to FIGS. 2 to 6, while the following FIGS. 7 and 8 relate to a servo adaptation of the drive system of this embodiment. In alternative constructions, other specific waveshapes may be produced by appropriate analog means. In one such embodiment, the output of the sensor may be modified to provide phase displaced sine-waves, the instantaneous magnitudes of which at each rotor position are used directly to establish the appropriate relative values for the winding currents. An embodiment of this kind of the system according to the invention is described having regard to FIGS. 15 to 21. In each embodiment, the current regulating means formed by generator 27 and controller 28 is further responsive to the "set level" signal to establish an absolute magnitude for the current at each rotor position, while the relative value of the current at that position compared with its value at any and every other position is determined by the rotor position as signalled by the sensor.

Figure 2:
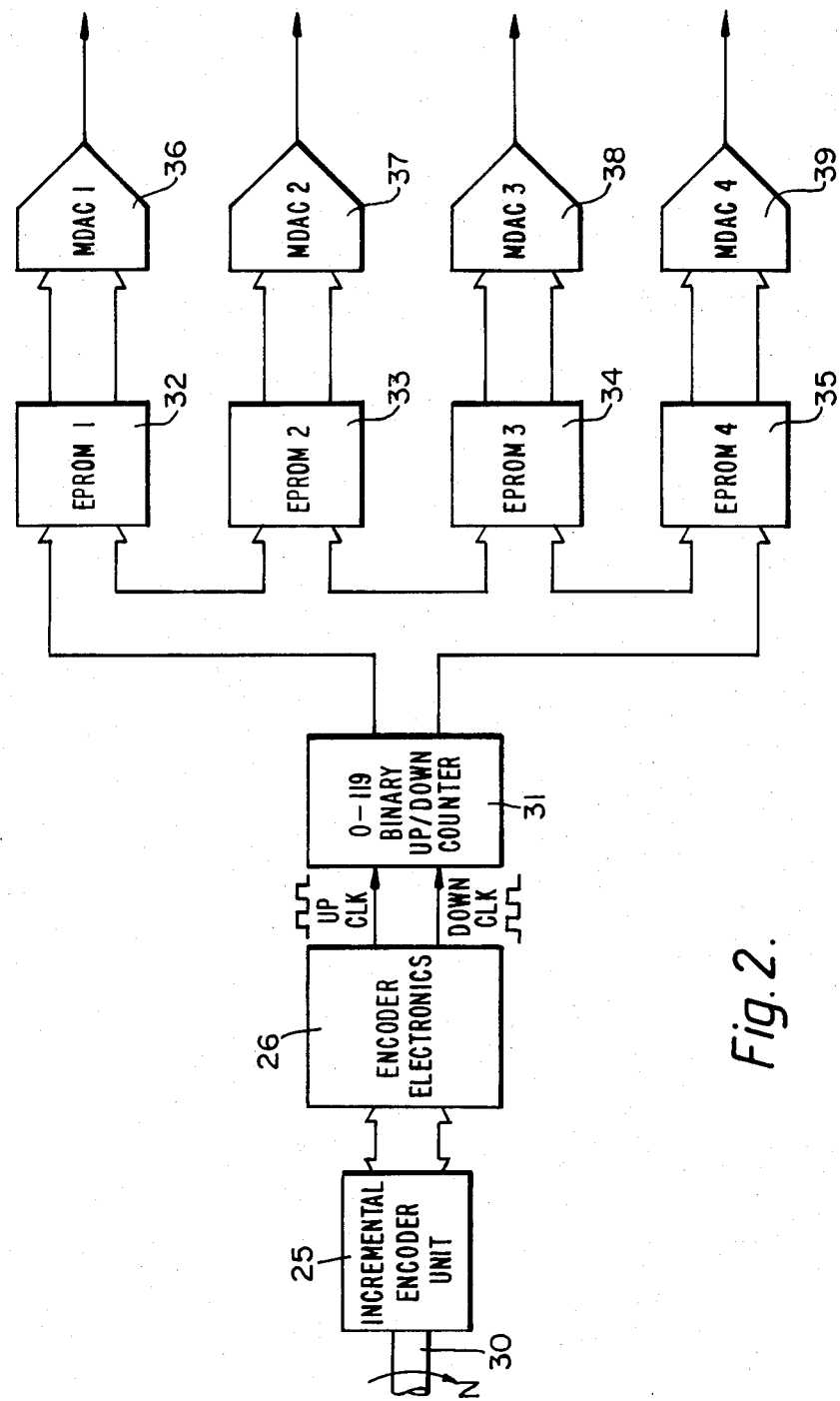
FIG. 2 is a block diagram showing a reference waveform generator for the system of FIG. 1, the generator incorporating erasable read only programmable memories (EPROMs)

FIG. 2 is a block diagram of a waveform generator 27 for the system of FIG. 1 incorporating EPROMs. As will be subsequently be described in more detail, the EPROMs hold digitized magnitudes for reference current waveshapes at each incremental rotor angle. The signals from the encoder 25 are electronically processed by interface 26 to provide 0.5° shaft position information. This information addresses the EPROMs 32 to 35 so that the correct phase current values corresponding to each 0.5° shaft position appear at the EPROM outputs. Each phase current waveform for the four-phase motor 23 of FIG. 1 is periodic over each 60° sector of shaft rotation so that the current waveform for each phase is stored in 120 locations of the relevant one of the memories 32 to 35 for that phase and is accessed six times during each shaft revolution. This achieved by means of a modulo-120 pure binary synchronous up-/down counter 31 interposed between processor or interface 26 and the EPROMs. The resulting digital position information is processed to form the address bus of the four EPROMs, in the arrangement shown in FIG. 2.

In an alternative arrangement, two EPROMs may suffice for storage of reference current waveform data for four phases, in conjunction with downstream digital to analog converters and demultiplexers, so that four output reference waveforms may be generated. The storage space of the memories may also be sufficient to allow several sets of waveforms to be held, each waveform applying to a different speed range of the motor, and the system may allow selection of the appropriate waveform in dependence on motor speed. The system is operable either from an absolute position encoder or from an incremental optical encoder, a resolver or any other sensor capable of providing the necessary degree of identification of rotor angular position. With an optical encoder, a larger number of pulses per revolution may also be derived so that resolution down to 0.25° may be achieved.

The information contained in these EPROMs consists of digitized current waveforms, examples of which are shown in subsequent Figures. The waveforms for forward and reverse torque output are stored in different memory banks and the sign of the generated torque is under control of a particular address bit of the EPROMs. The origin for the position information is typically the point of maximum reluctance of phase one and the waveshapes are stored for one complete electrical cycle, which corresponds to 60° mechanical for a six-pole rotor in the four-phase machine. The interface electronics reset the address bus to the origin after every 60° of shaft rotation. Thus, as the shaft rotates, the EPROM data outputs produce the digitized current waveshapes necessary to generate positive or negative torque in the motor. The retrieved waveforms from the EPROMs feed multiplying digital to analog convertors (MDACs) 36 to 39 and the outputs of these are the analog forms of the phase current reference waveforms. These outputs form the final outputs of the waveform generator, each phase having an individual output.

Figure 3:
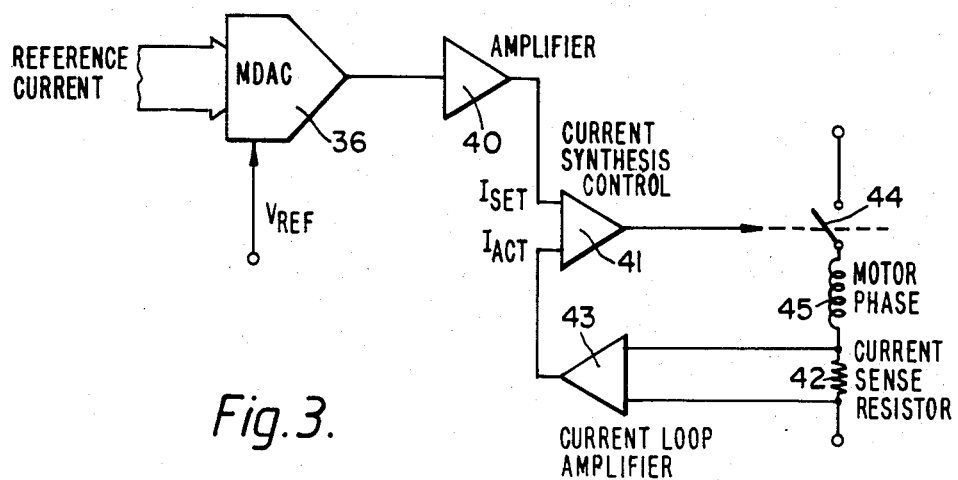
FIG. 3 is a block diagram of the current synthesis portion of the drive system of FIG. 1.

Each phase also has its own current synthesizer and FIG. 3 shows a current synthesis circuit for one phase. Since the amplitude of the motor current is also a function of the required torque, it is necessary to control the reference current amplitudes of all four phases simultaneously by a single control signal. Accordingly the output voltage of each MDAC, e.g. MDAC 36 in FIG. 3, is under control of a reference voltage giving smooth, matched control of the analog reference current amplitudes. Each reference current signal is then amplified by an amplifier 40 and fed to an analog comparator, indicated by the current synthesis controller 41 of FIG. 3, together with an amplified and filtered version of the corresponding actual current waveform, as sensed by resistor 42 and returned to controller 41 by loop amplifier 43. The output signal from comparator 41 is used to produce the gating signals for the respective power semiconductor device in the inverter circuit, indicated by switch 44 in FIG. 3.

Current synthesis may be performed using fixed frequency pulse width modulation or variable frequency pulse width modulation. Since variable reluctance motors operate with unidirectional stator currents, only a single power switching device 44 is required in series with each phase winding 45 as shown in FIG. 3.

Figure 4:
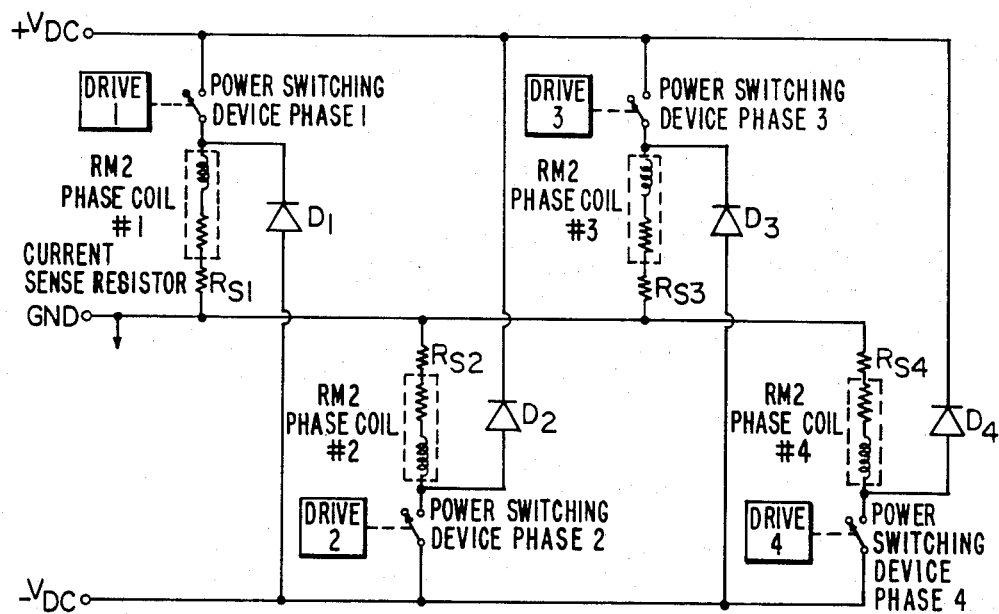
FIG. 4 shows a four-phase inverter for the drive system of FIG. 1.

A four phase inverter circuit for the system of FIG. 1 is shown in FIG. 4. This operates from a three-rail supply and preferably uses power Darlingtons. Alternatively power metal oxide semi-conductor field effect transistors (MOSFETs) may be employed. However further alternative power switching devices may also be used.

In a particular construction of motor used for the system of FIG. 1, the rotor of the reluctance motor is skewed so as to produce approximately sinusoidal static torque/angle characteristics for the four phases, as described and illustrated in said co-pending patent application entitled "Variable Speed Variable Reluctance Electrical Machines". These curves are shown in idealized form in FIG. 5, where the current in each phase is assumed to be the same and the origin is chosen to be the point of maximum reluctance of phase one, which position of the rotor is illustrated in FIG. 6 of said co-pending Application for a four-phase square-framed machine having eight stator poles and six rotor poles. If it is accepted that the gain, K, of each phase, in terms of torque per unit current, is approximately constant, then each torque waveform may be expressed as $$T_m = K I_m \sin[\theta_{elec} - (m-1)90°]$$

where
  $T_m$ = Torque contribution from phase m
  $I_m$ = Phase current in phase m
  $\theta_{elec}$ = Rotor angular displacement in electrical degrees measured from the point of maximum reluctance of phase one.
and
  m = 1, 2, 3 or 4.
In particular then, it is clear that:

$$T_1 = K I_m \sin \theta_{elec}$$

$$T_2 = -K I_m \cos \theta_{elec}$$

$$T_3 = -K I_m \sin \theta_{elec}$$

$$T_4 = K I_m \cos \theta_{elec}$$

for $$0° < \theta_{elec} < 360°$$

Figure 5:
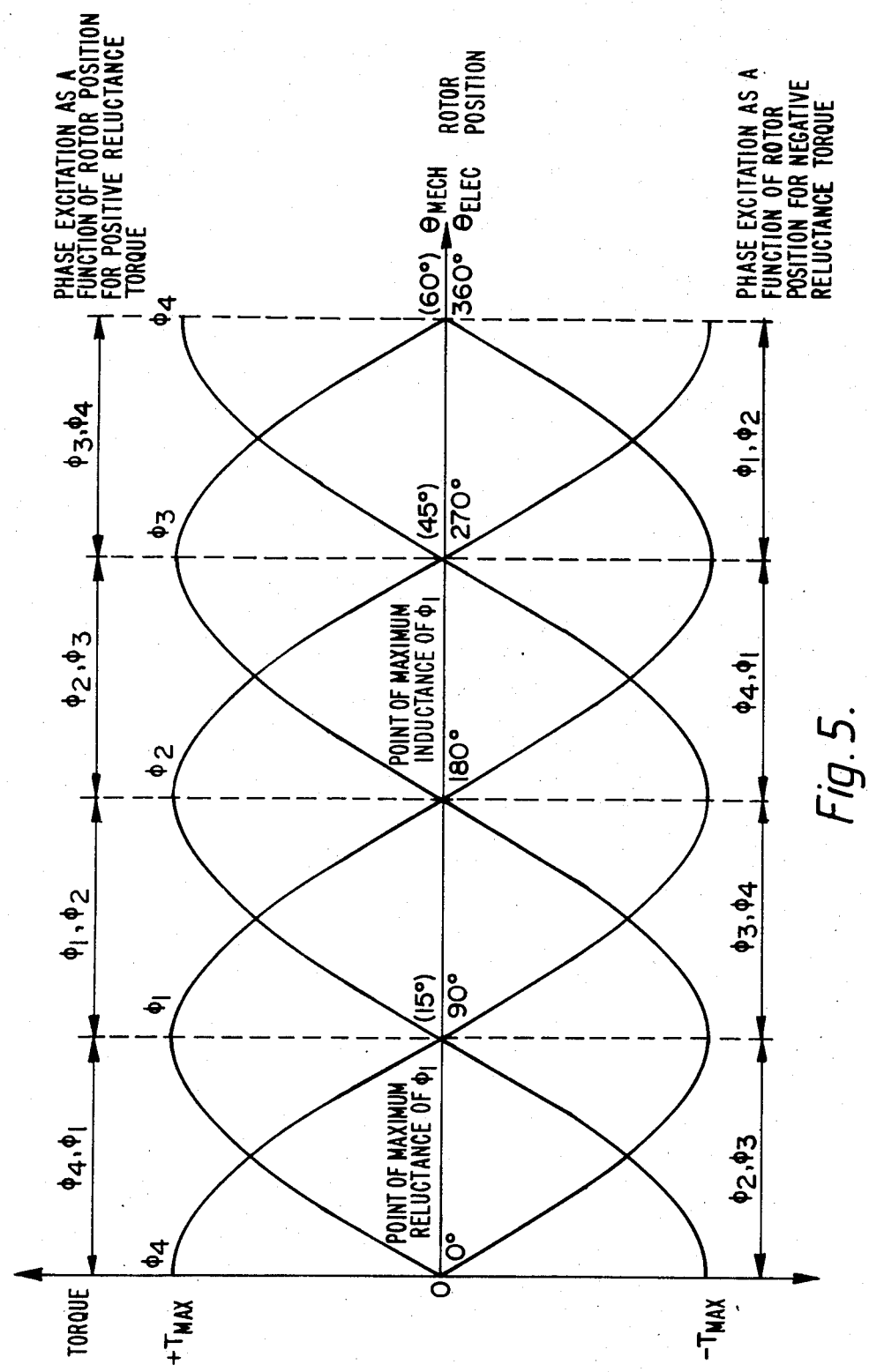
FIG. 5 is a diagram showing idealized sinusoidal static torque versus rotor angle characteristics for a variable reluctance motor to achieve a constant motor torque output, as well as the particular phases to be excited to achieve positive and negative output torques respectively from the machine during operation.
Figure 6:
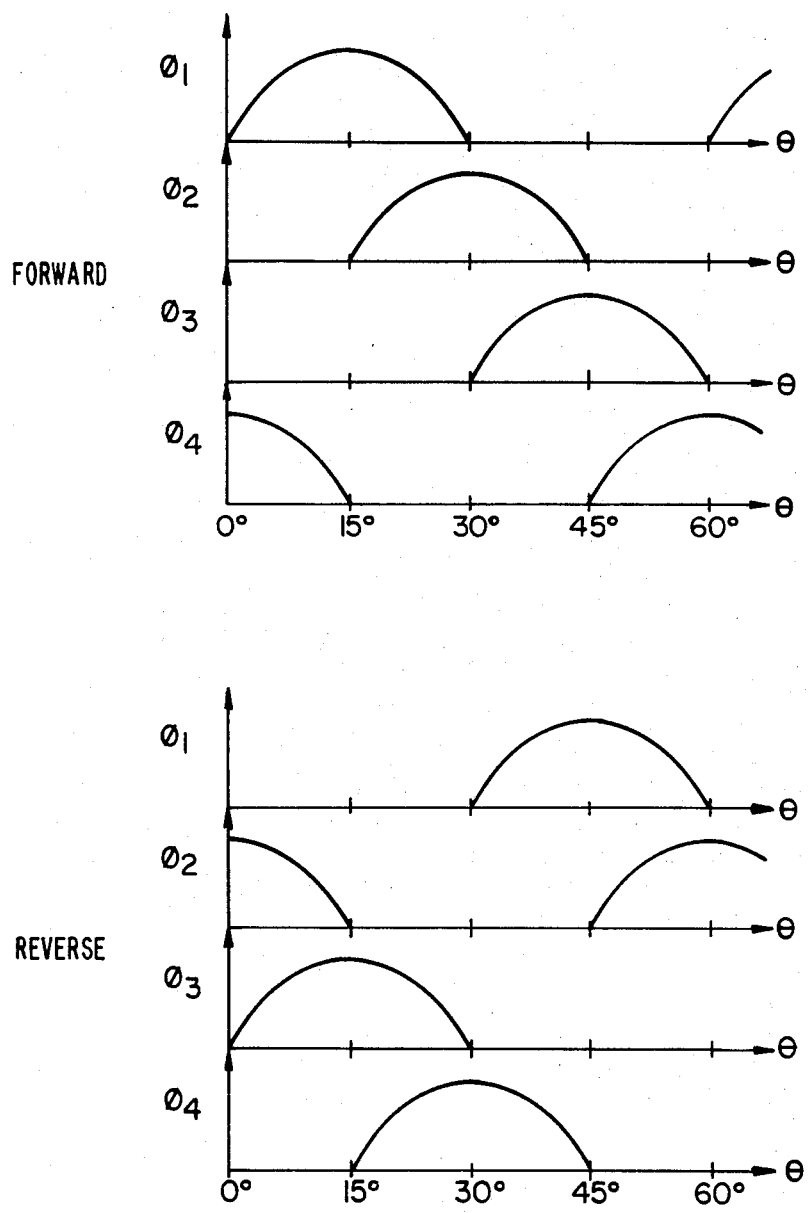
FIG. 6 is a diagram showing the current waveforms to be stored in the EPROMs of the drive system of FIGS. 1 and 2 for forward and reverse rotation respectively of the motor, using sinewave currents.

As can be seen from FIG. 5, with sinusoidal phase torques, there must, in general, be two overlapping or adjacent phases active at any given angular position if the total torque output is to be maintained constant, although, as described in the co-pending Application previously referred to, this is not necessarily the case for other waveforms, where, while two phases must be active during torque transition between phases, at other times only one phase may be active. In the present case however, for positive torque output, the active phases as a function of rotor position are as shown in Table 1 below.

TABLE 1

Active phases for Positive Torque Output as a Function of Rotor Position.

| $\theta_{elec}$ | ACTIVE PHASES |
|---|---|
| 0° → 90° | $\phi_4, \phi_1$ |
| 90° → 180° | $\phi_1, \phi_2$ |
| 180° → 270° | $\phi_2, \phi_3$ |
| 270° → 360° | $\phi_3, \phi_4$ |

Similarly for negative torque output, or reverse direction of rotation, the following Table 2 is valid.

TABLE 2

Active Phases for Negative Torque Output as a Function of Rotor Position.

| $\theta_{elec}$ | ACTIVE PHASES |
|---|---|
| 0° → 90° | $\phi_2, \phi_3$ |
| 90° → 180° | $\phi_3, \phi_4$ |
| 180° → 270° | $\phi_4, \phi_1$ |
| 270° → 360° | $\phi_1, \phi_2$ |

Thus, if for example, the rotor is between 0° and 90° and positive torque is required, currents $I_1$ and $I_4$ are synthesized in phases 1 and 4. The total torque, at any angle, $\theta_{elec}$, is then $$T(\theta_{elec}) = T_1 + T_4$$

$$= K I_1 \sin \theta_{elec} + K I_4 \cos \theta_{elec}$$

If the control system measures rotor position $\theta_{elec}$ and synthesizes currents $I_1$ and $I_4$ such that $$I_1 = I_{max} \sin \theta_{elec}$$

$$I_4 = I_{max} \cos \theta_{elec}$$

then the total generated torque becomes $$T(\theta_{elec}) = K\, I_{max} \cos^2 \theta_{elec} + \sin^2 \theta_{elec}$$

$$= K\, I_{max}$$

for $$0° < \theta_{elec} < 90°$$

Hence, the total generated torque under these circumstances is a constant independent of rotor position. A similar situation exists for the three other possible phase combinations. Thus, for a constant positive torque output, half-wave rectified sinusoids of current are synthesized in each of the phases for the positive regions of their static torque angle characteristics. The appropriate current waveshapes in their sequence for forward rotation or positive torque are shown in the upper part of FIG. 6, along with, in the lower part of FIG. 6, the sequence of phase current waveshapes which must be synthesized if negative torque or reverse rotation is required. The sign of the generated torque is dependent only on the rotor position, $\theta_{elec}$ and on the particular phases energized. It is not a function of the direction of the actual currents in the phase windings.

Figure 7:
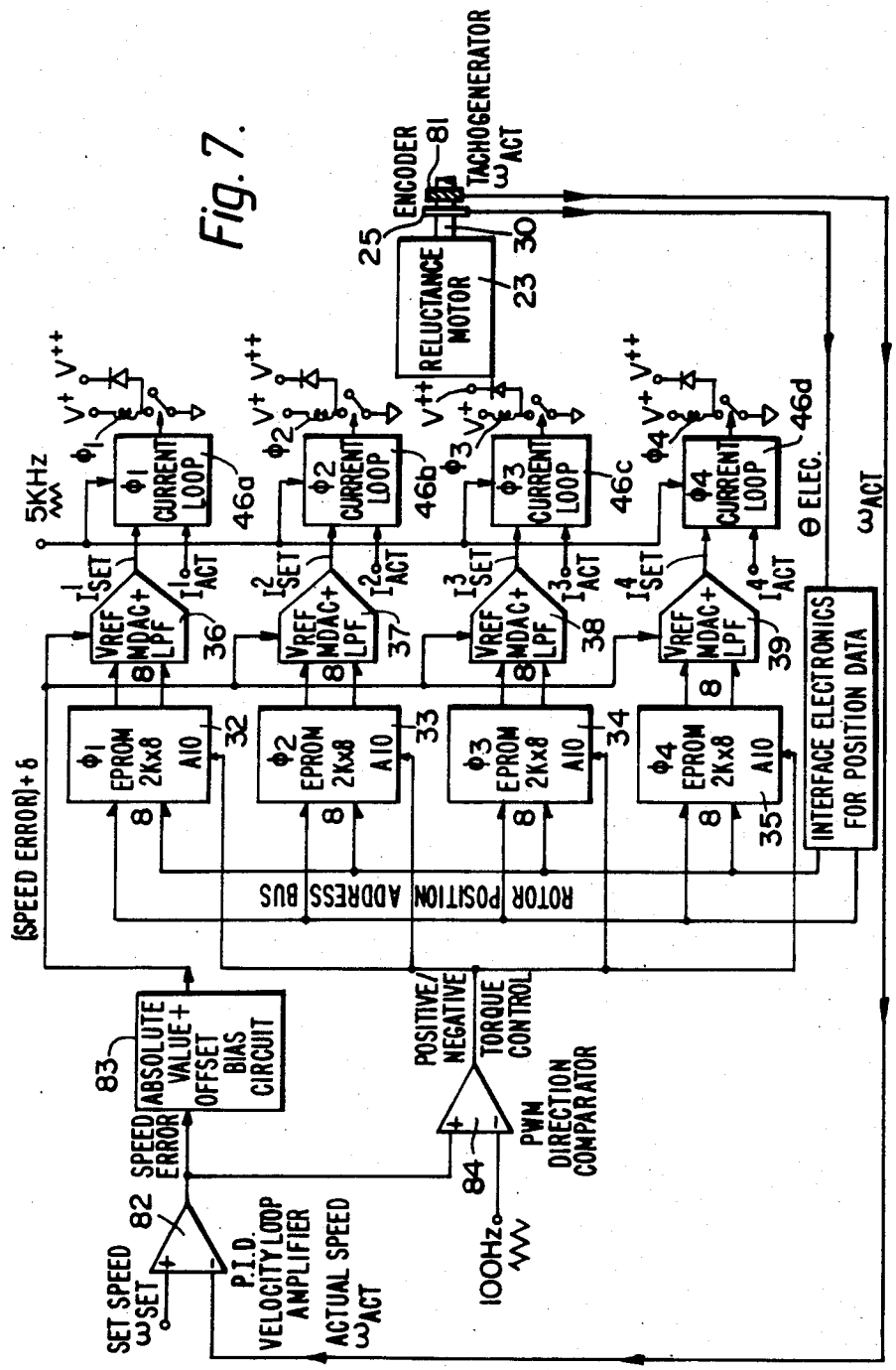
FIG. 7 is a schematic diagram of a control system for the VRM (variable reluctance motor) drive system of FIG. 1, in a servo adaptation.

A comprehensive block diagram showing a servo-controller for achieving high performance closed-loop speed control of a saturable variable reluctance motor and enlarging on the current-magnitude regulating portion of the drive system of FIG. 1 is shown in FIG. 7. The arrangement in regard to current magnitude regulation is substantially identical with that outlined in regard to FIG. 2, but the final stage is shown in more detail. In this final stage, the digital current waveshapes are reproduced at high current levels in the motor phases through the use of the MDACs 36 to 39 and conventional Proportional/Integral/Differential (PID) current loops 46a to 46d. The digital waveforms are first converted to analog form in the MDACs where the reference voltage, $V_{REF}$, is used to control the overall amplitude of the phase currents. The output of each MDAC is the product of the appropriate digital current waveshape from the respective EPROM, this determining the relative magnitude of each phase current during the period of energisation of the phase, and the analog reference voltage $V_{REF}$, which is common to all four phases and establishes the absolute magnitude of the energizing currents in the phase windings. These MDAC voltages then become the set or target currents in the four PID current loops which use conventional, FET input, operational amplifiers. These current loops act to force the actual phase currents to track the set currents by controlling the switching times of the power devices in the power converter driving the motor. The switching frequency of these devices is kept constant at 5 kHz by using a synchronizing triangular wave at this frequency, although higher frequencies may also be used.

This system has the capability of producing from the variable reluctance motor substantially any desired torque output compatible with its static torque characteristics. In addition, the magnitude of the torque output may be electronically controlled by varying the analog reference voltage, $V_{REF}$, and its direction may be changed simply by switching EPROM address banks via the appropriate address bit.

Since the EPROMs are capable of storing substantially any desired reference waveform, various strategies for overcoming the problem of the initial rapid torque rise at the commencement of pole overlap and the torque ripple arising from switching between the roll-off portion of the phase coming to an end and the rising torque portion of a phase beginning overlap may be adopted, but a preferred strategy is that set out hereinabove in regard to FIGS. 5 and 6 of the present specification, where sinusoidal phase currents are applied to the phase windings and the static torque versus rotor angle characteristics of the motor are modified to a substantially sinusoidal form by rotor pole skewing. This strategy is also further explained in said co-pending patent application entitled "Variable Speed Variable Reluctance Electrical Machines", in regard to FIG. 18 of that application.

In further amplification of this strategy, open-loop torque smoothness in the reluctance motor drive system is in general achieved by shaping the static-torque/rotor angle characteristics of the motor and selecting and synthesizing appropriate phase current waveshapes to produce constant torque independent of rotor position. In the present particularization of this strategy, sinusoidal currents and sinusoidal static torque characteristics are favoured. The use of EPROMs in implementing this strategy provides an especially versatile and powerful means of overcoming any non-idealities encountered in the highly non-linear, doubly salient reluctance motor, in that the current waveforms stored in the EPROMs may be of whatever shape is most appropriate for a given motor. As long as there is torque overlap between phases, currents can always be selected to give constant torque output. The required current waveforms may be calculated by computer means either at the design stage or from analysis of actual experimental data. However, the sinusoidal realization described herein and favoured may in general be implemented without such individual waveshape tailoring, in that non-idealities are found to be of less significance in the case of sinusoids.

In open-loop operation of this strategy, rotor shaft position, $\theta_{elec}$, is measured using digital position sensor 25, and this digital position information is processed to form the address bus of the four Erasable Programmable-Read-Only-Memories (EPROM's) 32–35, one for each phase. The digitized current waveforms for forward and reverse torque output are stored in different memory banks of the EPROMs and the sign of the generated torque is under control of the most significant address bit $A_{10}$ of the EPROM's. The origin for the position information is the point of maximum reluctance of phase one and the waveshapes are stored for one complete electrical cycle, 0° elec to 360°, which is 60° mechanical for the eight stator pole, six stator pole four-phase machine of FIG. 1. The position interface electronics resets the address bus to the origin after every 60° of shaft rotation. Thus, as the shaft rotates, the EPROM data outputs produce the digitized current waveshapes necessary to generate smooth positive or negative torque in the motor, and the high currents for the motor phases are reproduced in the final stage of the controller, as already described.

This system has the capability of producing smooth torque output from the variable reluctance motor. The magnitude of the torque output may be electronically controlled by varying the analog reference voltage, $V_{REF}$, and its direction may be changed simply by switching EPROM address banks via $A_{10}$. These two electronic torque control inputs greatly facilitate the provision of a servocontroller for achieving high-performance closed-loop speed control of a saturable variable reluctance motor, and the embodiment of a controller such as shown in FIG. 7 is built on and includes the features of this open-loop control configuration as described above.

In order to achieve closed-loop speed control of the reluctance motor 23, an analogue speed error voltage is first derived as in the case of a conventional dc servomotor. This speed error voltage is obtained by using a standard analog tachogenerator 81 coupled to the motor shaft 30 to give an actual speed feedback signal, which is then compared with a voltage proportional to the desired speed in a PID rate loop amplifier 82 such as is common in many dc servomotor drives. This error voltage is then processed so as to provide the torque magnitude and direction inputs required by the open-loop controller portion of the servocontroller of FIG. 7. In this manner speed fluctuations are corrected by the appropriate variations in generated motor torque, thus producing the required servomotor performance.

In a classic dc servosystem, the speed error voltage becomes the set current level, and hence the set torque level, in a dc brush motor. This speed error voltage is a bipolar signal and a positive to negative transition implies a reversal of current direction, and hence torque, in the motor. In the reluctance motor, however, reversing the direction of current in the phase windings has no effect since the torque produced is independent of phase current direction. Hence, a positive to negative speed error transition in this case requires the phase excitation sequence to be altered so as to synthesize current in the phases for the negative torque regions of their torque-/angle characteristics, as already described in regard to FIGS. 5 and 6. The sign of the speed error voltage is used to determine whether positive or negative torque is required. This implemented as shown in FIG. 7, through the use of an analogue comparator 84, in which the bipolar error voltage is compared to a 100 kHz, low amplitude, triangular wave. The comparator produces a high frequency pulse-width-modulated torque direction signal for a small band about the zero speed error point. This technique eliminates deadband in the transition between positive and negative torque and helps to produce static stiffness at zero speed and to ensure a smooth transition from positive to negative torque.

The absolute value of the bipolar error voltage is used to derive $V_{REF}$, the torque demand signal, which serves to control the absolute magnitude of the current synthesized in the phase windings. A small constant offset, or bias, voltage is added by circuit 83 to the absolute value circuit output so as to ensure that some current is always synthesized in the windings, thereby to provide static stiffness and improved dynamic performance of the drive.

In a servo-control system, under standstill conditions, i.e. at zero speed, the motor shaft is static, and in order to keep it from rotating, e.g. while holding a load, equal positive and negative torques must be generated. Bias or offset is used to control the magnitude of the current in the phases, and under standstill conditions, all four phases of the motor may be active with small, equal, positive and negative torque-generating currents being synthesized due to the 50% duty cycle of the torque direction PWM signal. At very low speed and in particular under zero load, a small speed error voltage comes into existence which increases the magnitudes of the currents generated in the phases, but while all four phases may again be active, slightly more current will be synthesized in one pair of phases than in the other, so that the resulting differential in the positive and negative torque currents will provide the torque required to maintain the shaft speed constant at the low speed value selected.

Figure 8:
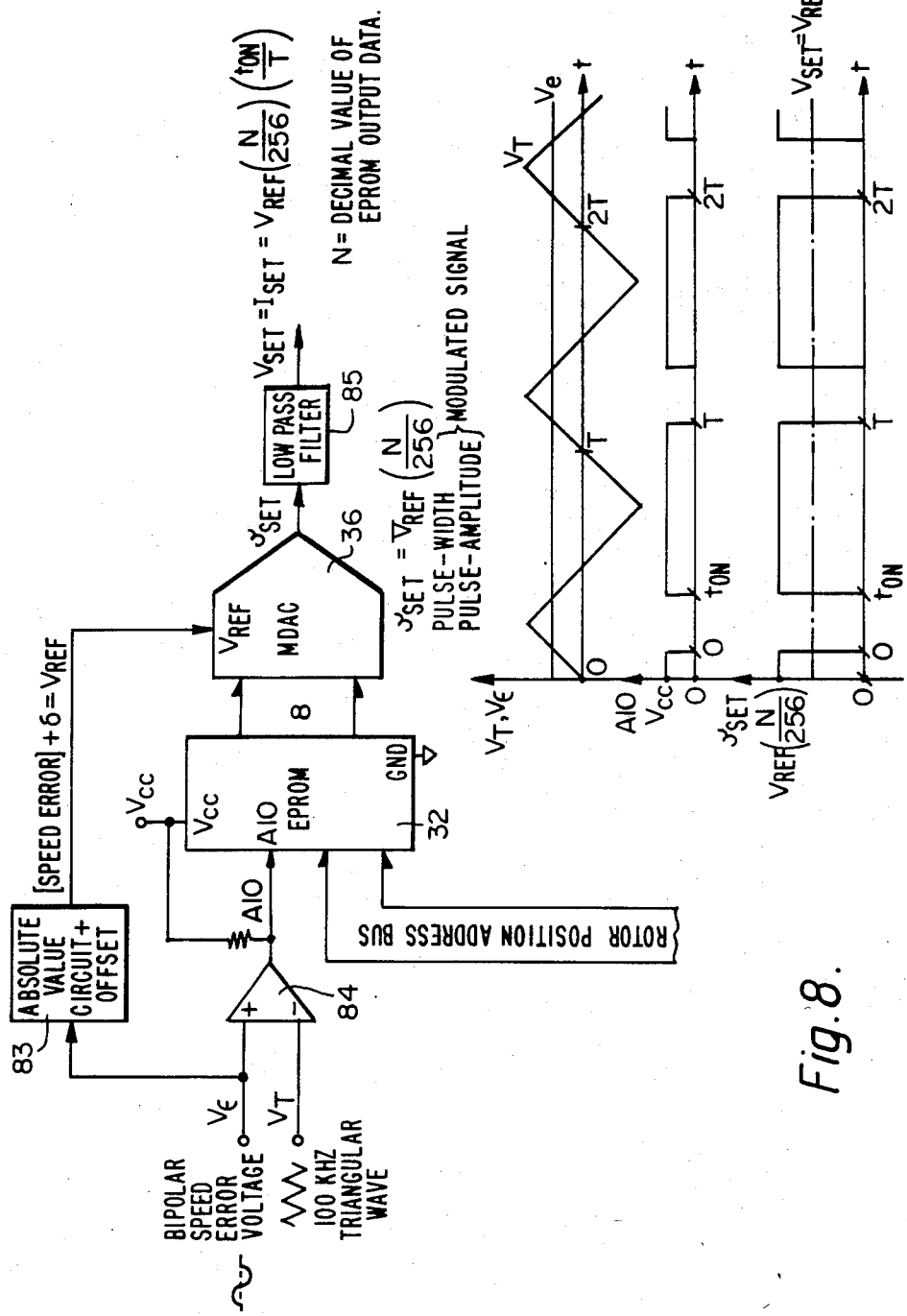
FIG. 8 is a detailed diagrammatic representation of the operation of one phase of the servo control system of FIG. 7, together with a graphical exemplification of the voltages prevailing at different locations within the system during its operation.

The operation of the system shown in FIG. 7 is as follows. For large speed errors, the torque demand, set by $V_{REF}$ and met via the appropriate current waveforms, is either entirely positive or entirely negative, depending on the sign of the speed error. As the speed error signal approaches zero, the torque direction signal becomes pulse-width-modulated and both the positive and negative torque memory banks in the EPROM's are selected alternately at high frequency with an on-time, $t_{on}$, determined by the intersections of the speed error voltage with the 100 KHz triangular wave input to comparator 84. This means that in this region the outputs of the four MDAC's are effectively pulse-width-modulated by the sign of the torque demand and amplitude modulated by the magnitude of the speed error voltage. Since only the average value of the MDAC output signals is required, a low pass filter (LPF) 85 (FIG. 8) following the MDACs 36 to 39 in each case removes the 100 kHz carrier frequency leaving only the four set currents appropriate for driving the reluctance motor at the required speed. FIG. 8 is a schematic diagram illustrating the detailed operation of one phase of the servocontroller for a speed error voltage near zero giving a pulse-width-modulated comparator signal with an on-time $t_{on}$. Typical waveforms for this condition are also shown in FIG. 8.

The uppermost waveform shown in FIG. 8 represents the 100 kHz triangular wave $V_t$ and the bipolar speed error voltage $V_e$. When $V_e$ is less than the peak value of the triangular wave $V_t$, the error voltage intersects the wave, and the proportion of time on and off for the forward and reverse memory banks of the EPROMs is determined by the relative durations of the portions of the triangular wave above and below the error voltage, as depicted graphically in the middle waveform of FIG. 8 for one of the memory banks in terms of $V_{cc}$. The lowermost diagram of FIG. 8 shows both the modulated $V_{set}$ after the MDAC 36 and the demodulated $V_{set}$ as it exists after the low pass filter 85 in these circumstances. Again the relative magnitude of the currents in the phase windings at each instant during the energization of the windings is determined by the synthesization using the memory banks of the EPROMs and the absolute magnitude of the phase currents at each instant during winding energization is established in response to the reference voltage or torque demand signal $V_{REF}$ derived from the set speed or level input and the shaft speed signal.

The overall operation of the servocontroller of FIGS. 7 and 8 may be illustrated by three separate examples.

(i) zero demanded speed on zero load
(ii) very low speed on zero load
(iii) any speed on load (i) For zero speed on zero load, the shaft is static and equal positive and negative torque must be generated. The absolute value of the speed error is very small and the bias or offset of FIGS. 7 and 8 is used to control the magnitude of the current in the phases. In general all four phases will be active with small, equal positive and negative torque currents being synthesized due to the 50% duty cycle of the torque direction PWM signal.

(ii) The case of very low speed on zero load is similar to that described in (i), except that now a small speed error voltage exists which increases the magnitude of the currents generated in the phases. Again all four phases may be active but now slightly more current will be synthesized in one pair of phases than in the other. This differential in the positive and negative torque currents gives the torque required to maintain the shaft speed constant at the low value set.

(iii) At any speed, on load, the speed error voltage increases positively or negatively and quickly loses its intersections with the low amplitude, 100 kHz, triangular wave. The torque demand is then either entirely positive or negative, and only positive or negative torque current is synthesized in the phases. In this condition, the speed of the machine is under the control of the absolute value of the error voltage, $V_{REF}$.

Figure 9A:
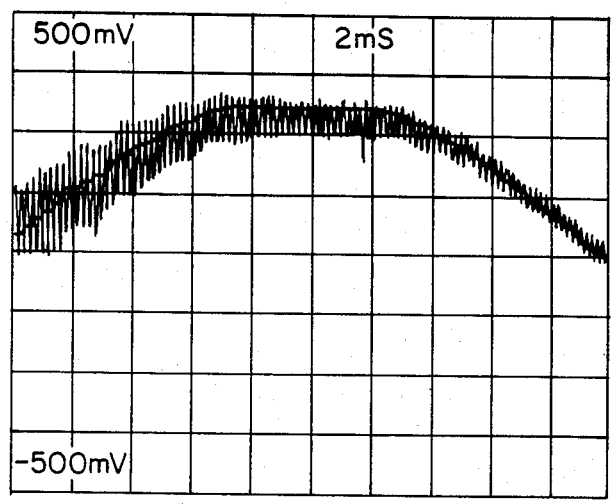
FIGS. 9A and 9B show current waveforms achieved or synthesized in a practical construction of the drive system of FIG. 1 at 250 and 1500 rpm respectively.
Figure 9B:
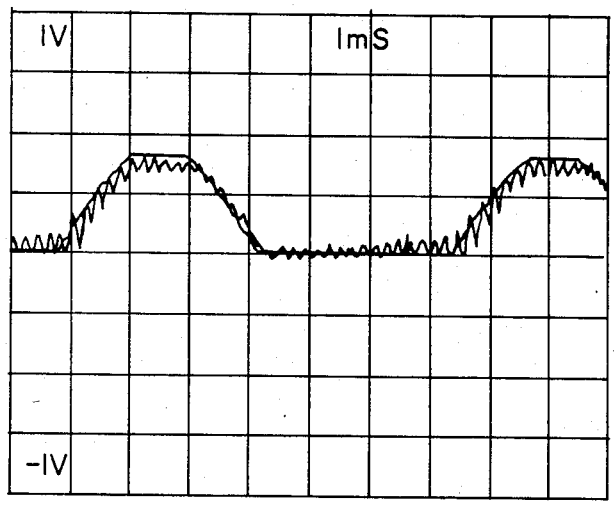

The control system described in these Figures uses pulse width modulation switching of the motor current. FIGS. 9A and 9B show actual current waveforms recorded at two shaft speeds for a motor equipped with a drive system embodying the principles of the invention. In each case the reference waveforms were flat-topped sinusoids, obtained by clipping the sinusoidal values when the EPROMs containing the reference waveforms were being programmed. At 250 rpm (FIG. 9A), with 5 kHz PWM, the accuracy of the synthesized sinewave is exceptionally good, while at 1500 rpm, FIG. 9B, the number of PWM switchings is clearly reduced, but the tracking of the sinewave remains accurate. At this higher speed, with less switchings available to synthesize the sinewave, the accuracy or tracking will clearly be less perfect, but it has been found that satisfactory waveforms may be achieved throughout the speed range of a motor by appropriate design of the control system, possibly also including firing advance at the higher speeds, if desirable.

Bias currents are used in virtually all servomotor systems to remove any deadband in response at the transition from positive to negative torque. Vestigial levels of current are sufficient for this purpose in permanent magnet motor systems. Variable reluctance motors however, are characterised by a highly non-linear torque-current relationship, in particular at low currents, and the effective current deadband may be a significant fraction of the thermal current rating. Adequate biassing for achieving servo performance must therefore be balanced against excessive biassing, which would be wasteful of motor rating.

The fundamental concept of bias is that the zero torque condition sould be achieved by having equal and opposite torques produced in the motor. If there is an abrupt transition between positive and negative torques, instability can occur around the transition point. Some examples of strategies for implementing bias currents in reluctance motors are described below, in particular in regard to a four-phase machine in which each torque-producing phase is exactly complemented by a phase producing an inverse torque. However the principles described in regard to the four-phase machine may be applied to any geometry in which the overlaps of the phase torques are sufficient to permit equal and opposite torques to be generated in every orientation of the machine rotor or driven member.

Figure 10:
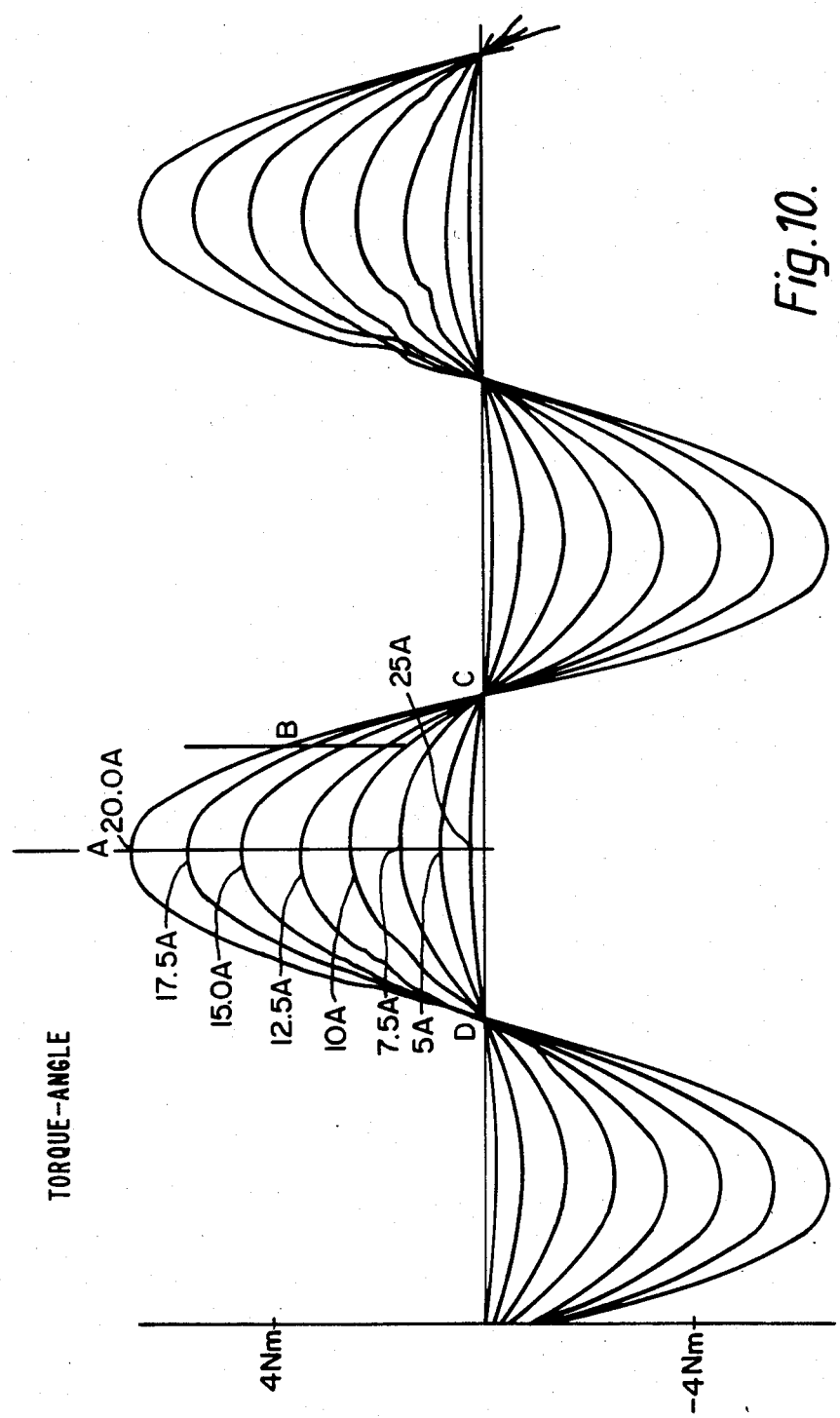
FIG. 10 shows static torque vs angle curves over a range of currents for a particular construction of variable reluctance motor.
Figure 11:
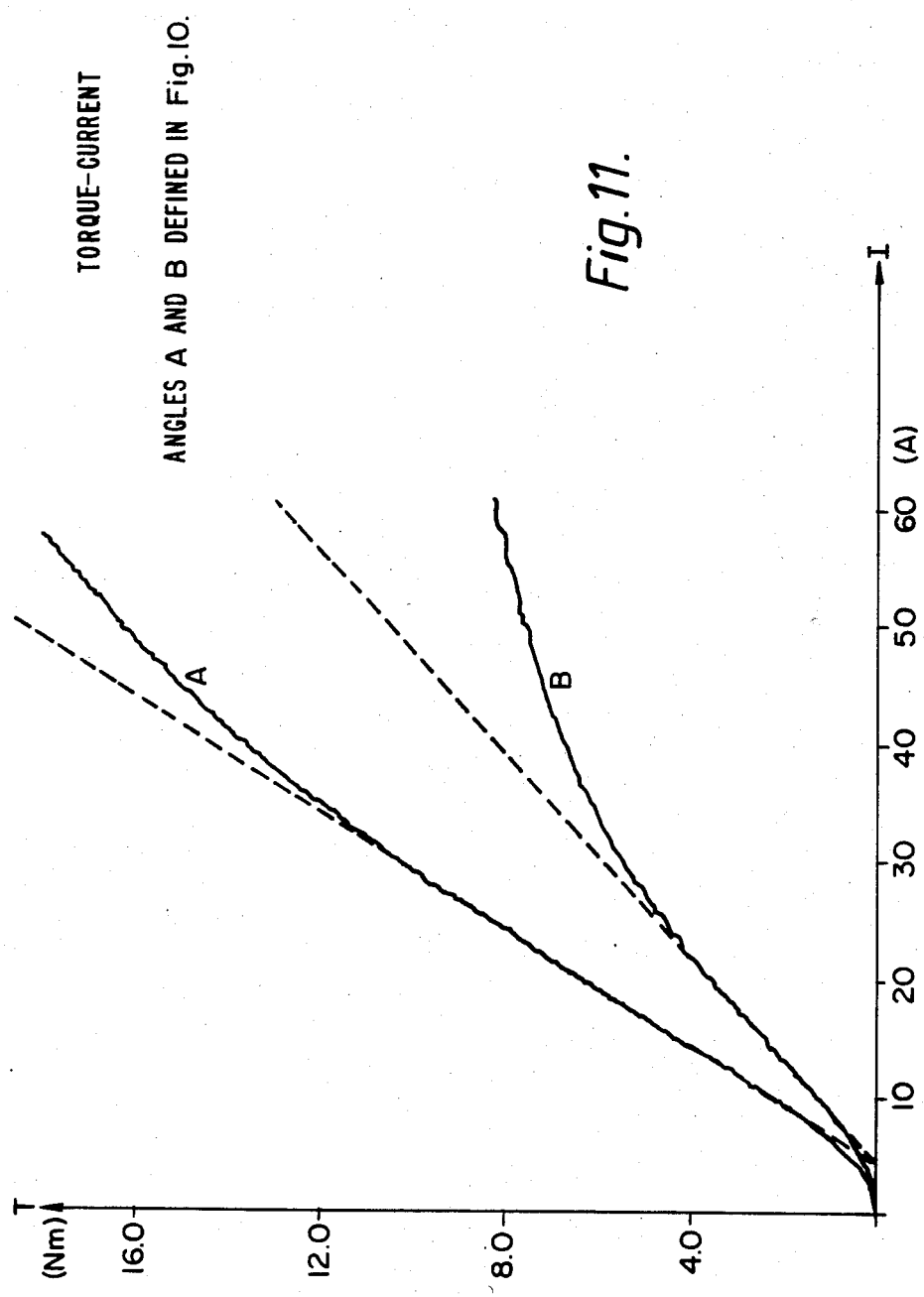
FIG. 11 shows the relationship between static torque and energizing phase current for two specific angular dispositions of the rotor of the machine, torque-angle plots for which are shown in FIG. 10.
Figure 12:
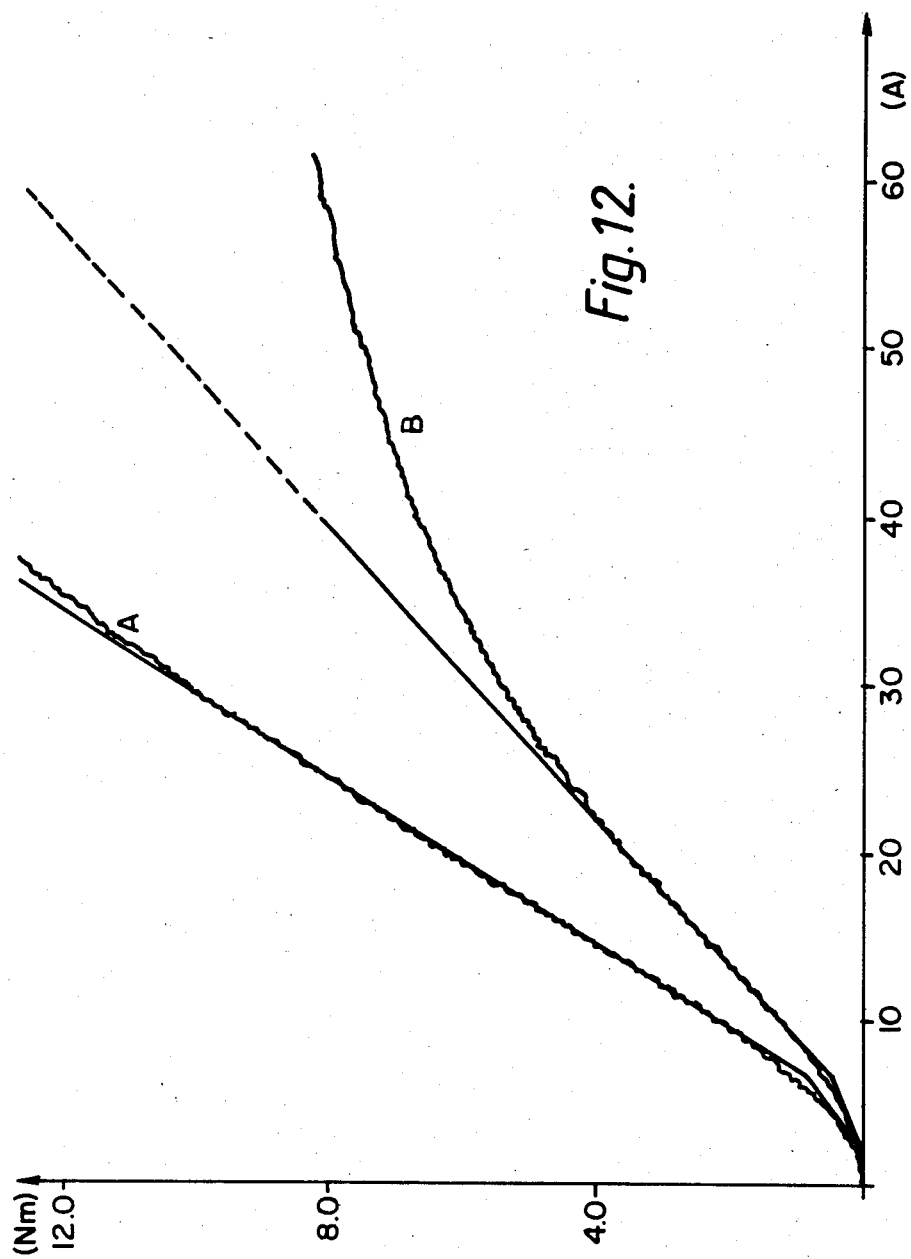
FIG. 12 is an enlargement of the part of FIG. 11 in the vicinity of zero torque and current.

Torque-angle curves for a range of currents are shown for a particular four-phase machine in FIG. 10. Torque-current curves at the angles indicated as A and B in FIG. 10 are shown in FIG. 11. It can be seen that torque roll-off at higher currents increases as the angle advances towards the minimum reluctance position C. However, the degree of roll-off is not excessive, and FIG. 11 gives a visual representation of the linearity of the torque-current response of the motor. FIG. 12 is an enlargement of the portions of the curves of FIG. 11 where they are most linear.

As explained in more detail in our co-pending Application previously referred to, simple theory indicates that for overlapping pole structures, torque is proportional to current squared, up to saturation levels in the iron, and is directly proportional to current after saturation has occurred. This is evident for the curves of FIGS. 11 and 12 for angles A and B, disregarding the high-current roll-off in torque associated with bulk saturation in the magnetic circuit.

In the motor to which FIGS. 10, 11 and 12 refer, the RMS thermal current limit was found to be 7.4A per phase, giving half wave rectified sine waves of 14.8A peak and suggesting a continuous motor rating of slightly in excess of 4 Nm.

It can be seen from FIG. 12 that only negligible torques are developed at less than 2A and that the rest of the curves can be approximated reasonably by two linear sectons, as indicated on FIG. 12. Accordingly a bias current of 2A may be applied to overcome the "true deadband" in the response, while a complementary gain break may be included at 6.5A in the current loop to further linearize torque as a function of current demand.

Thus current in the windings over one electrical cycle will be as indicated in FIGS. 13A and B, with a dc bias for zero torque demand and sinusoidal waves added to this as demand increases. Current is of course never negative. The implementation of FIGS. 13C, and D, in which current in the undesired torque producing regions reduces at an equal rate for all angles, rather than with a sinusoidal modulation, may have advantages for motor rating. When positive torque is demanded, the negative bias components require to be eliminated as quickly as possible, since they heat the motor in a wasteful manner.

However, the torque-current non-linearity of the motor helps in the speedy elimination of bias currents, when values are chosen as indicated in FIG. 14. Because the initial value of the torque constant ($K_t'$ Nm/A) is relatively low, a small torque demand will result in relatively high values of current. Since the rate at which unwanted bias currents decay is proportional to current demand in most implementations, they are thus quickly eliminated when a net torque is demanded.

Bias represented by the current $I_b$ is applied in the servo control system described in regard to FIGS. 7 and 8 by the association of a voltage offset with the speed error voltage to define the reference voltage $V_{REF}$ by which the absolute magnitudes of the current waveshapes are established. This bias fulfils two functions. Firstly, it allows servo performance to be achieved by removing the current deadband in the low current region, and, secondly, it displaces the relationship between torque and current as it applies during operation of the motor onto the substantially linear parts of the characteristics shown in FIGS. 11 and 12.

In the absence of permanent magnets, the bias current is required to be relatively large as a proportion of the rated machine current, since the motor must be magnetized in order to produce any appreciable torque and thereby avoid the torque deadband.

An all-analog control system capable of achieving servomotor performance, comparable to a d.c. servosystem, from a variable or switched reluctance motor is now described having regard to FIGS. 15 to 21 of the accompanying drawings. The control strategy described here is similar to that of the hybrid analog digital controller of FIGS. 7 and 8 except that it is implemented using only operational amplifiers, comparators and analog switches. The controller requires two sinusoidal voltages in quadrature from an analog shaft angle transducer thus obviating the need for analog/digital conversion in the sensor electronics. The system of the invention is again described for this embodiment in regard to a four-phase, eight stator pole, six rotor pole variable reluctance motor, but it is not limited to such a construction of motor.

Figure 15:
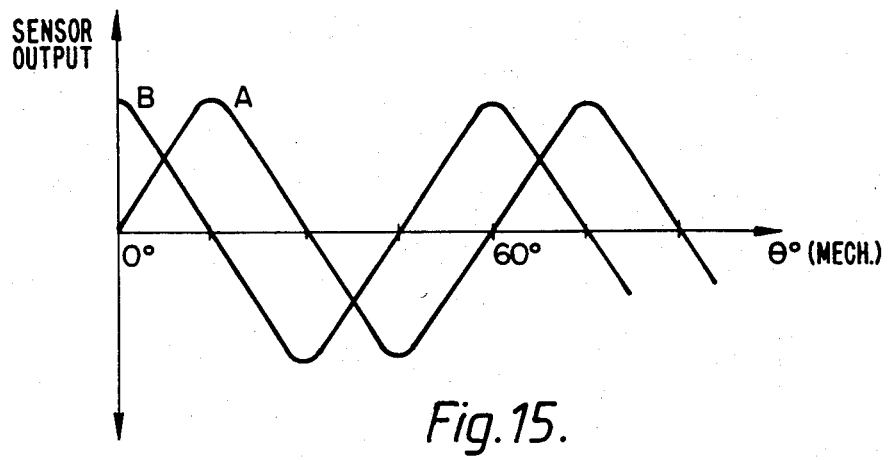
FIG. 15 shows the output waveforms of an analog position transducer for use in the system of the invention.
Figure 16:
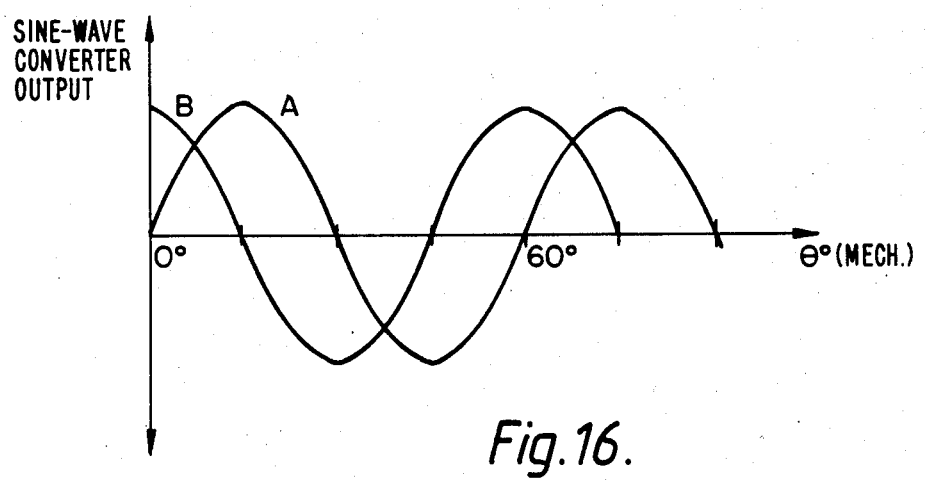
FIG. 16 shows sine and cosine waves derivable from the waveforms of FIG. 15.
Figure 17:
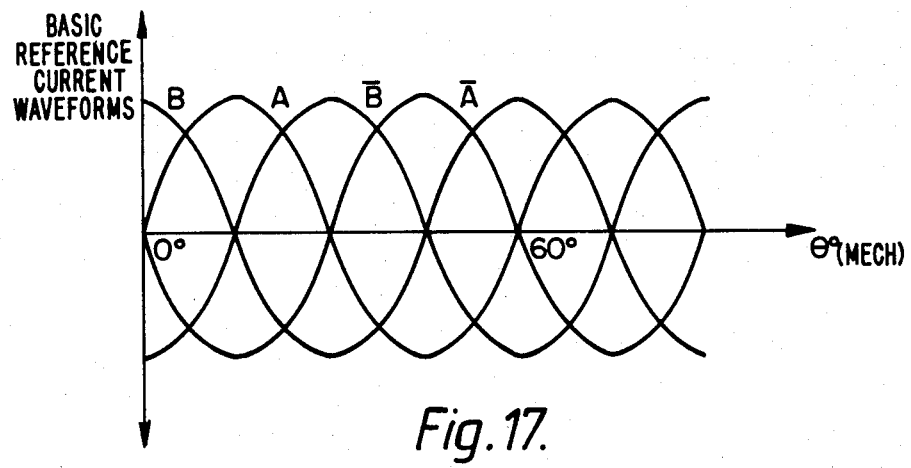
FIG. 17 shows the waveforms of FIG. 16 together with inverted derivatives, the four waveforms thus depicted being usable as reference waveshapes for a drive system in accordance with the invention.

The output of a position transducer in the form of two triangular waveforms in quadrature and cyclic in 60° mechanical is shown in FIG. 15. The peaks of these triangular waves may be slightly rounded as shown depending on the nature of the transducer. It is a relatively simple task to convert these rounded triangular waves to sinusoidal waveforms as shown in FIG. 16 by means of triangle to sine converters. The two "sine" and "cosine" waveforms, A and B respectively of FIG. 16, are both buffered and inverted, as shown in FIG. 17, to form four basic reference waveforms, A, B, $\overline{A}$ and $\overline{B}$. The basic concept underlying the analogue controller is that these waveforms then represent correct reference current waveshapes for achieving smooth torque output from a switched reluctance motor having an essentially sinusoidal torque/angle characteristic as already described in relation to the first embodiment of servo control system above and also as disclosed in said copending patent application for "Variable Speed Variable Reluctance Electrical Machines".

As already described in particular in regard to FIG. 6, positive or negative torque is created in the reluctance motor depending on the rotor position when current is synthesized in a phase winding. Since only unidirectional current is required in the motor, each of the four reference position waveforms A, B, $\overline{A}$ and $\overline{B}$ may be rectified in fast precision rectifiers to form $|A|$, $|B|$, $|\overline{A}|$ and $|\overline{B}|$. These waveforms may then be used to generate positive or negative reluctance motor torque according to the Table below, where the origin is taken to be the point of maximum reluctance of phase one.

| ROTOR POSITION | ACTIVE PHASES | REFERENCE WAVEFORMS |
|---|---|---|
| POSITIVE TORQUE | | |
| 0° → 15° | $\emptyset_4, \emptyset_1$ | $|\overline{B}|, |A|$ |
| 15° → 30° | $\emptyset_1, \emptyset_2$ | $|A|, |\overline{B}|$ |
| 30° → 45° | $\emptyset_2, \emptyset_3$ | $|B|, |\overline{A}|$ |
| 45° → 60° | $\emptyset_3, \emptyset_4$ | $|\overline{A}|, |B|$ |
| NEGATIVE TORQUE | | |
| 0° → 15° | $\emptyset_2, \emptyset_3$ | $|\overline{B}|, |A|$ |
| 15° → 30° | $\emptyset_3, \emptyset_4$ | $|A|, |\overline{B}|$ |
| 30° → 45° | $\emptyset_4, \emptyset_1$ | $|B|, |\overline{A}|$ |
| 45° → 60° | $\emptyset_1, \emptyset_2$ | $|\overline{A}|, |B|$ |

Figure 18:
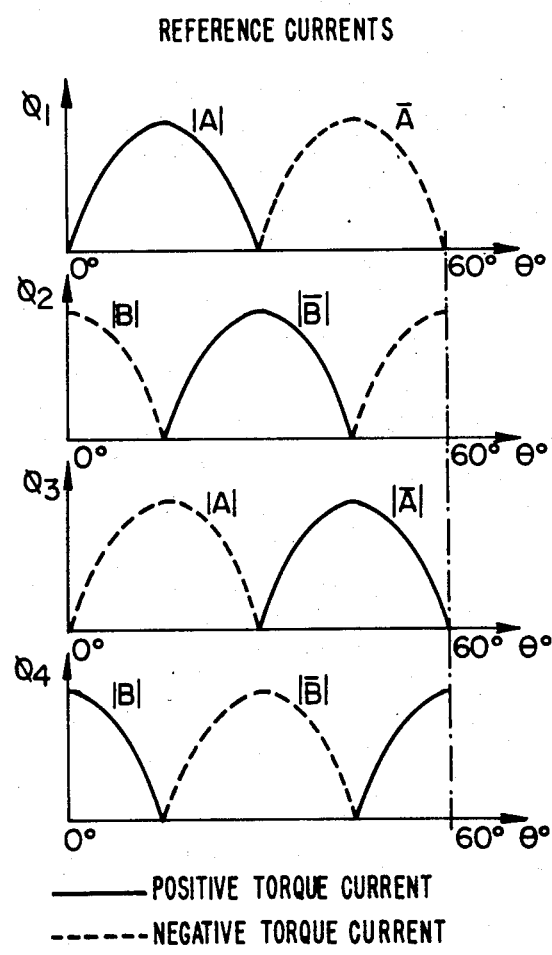
FIG. 18 is a graphical representation of the halfwave portions of the reference waveshapes of FIG. 17 to be associated with the various phase windings of a four-phase machine forming part of a system according to the invention.

From this table and inspection of its diagrammed representation in FIG. 18, it can be seen that for positive torque, $|A|$ is associated with $\emptyset_1$, $|\overline{B}|$ with $\emptyset_2$, $|\overline{A}|$ with $\emptyset_3$, and $|B|$ with $\emptyset_4$, whilst for negative torque it is the inverse: $|\overline{A}|$ with $\emptyset_1$, $|B|$ with $\emptyset_2$, $|A|$ with $\emptyset_3$, and $|\overline{B}|$ with $\emptyset_4$.

For servomotor performance, the amount of positive or negative torque at any instant must be determined by the difference between the actual and the set motor speed, that is, the velocity loop amplifier output voltage. In the circuit arrangement shown in FIG. 19, the velocity loop error voltage is used to select positive or negative torque, or a combination of small positive and negative torques about zero.

Figure 19:
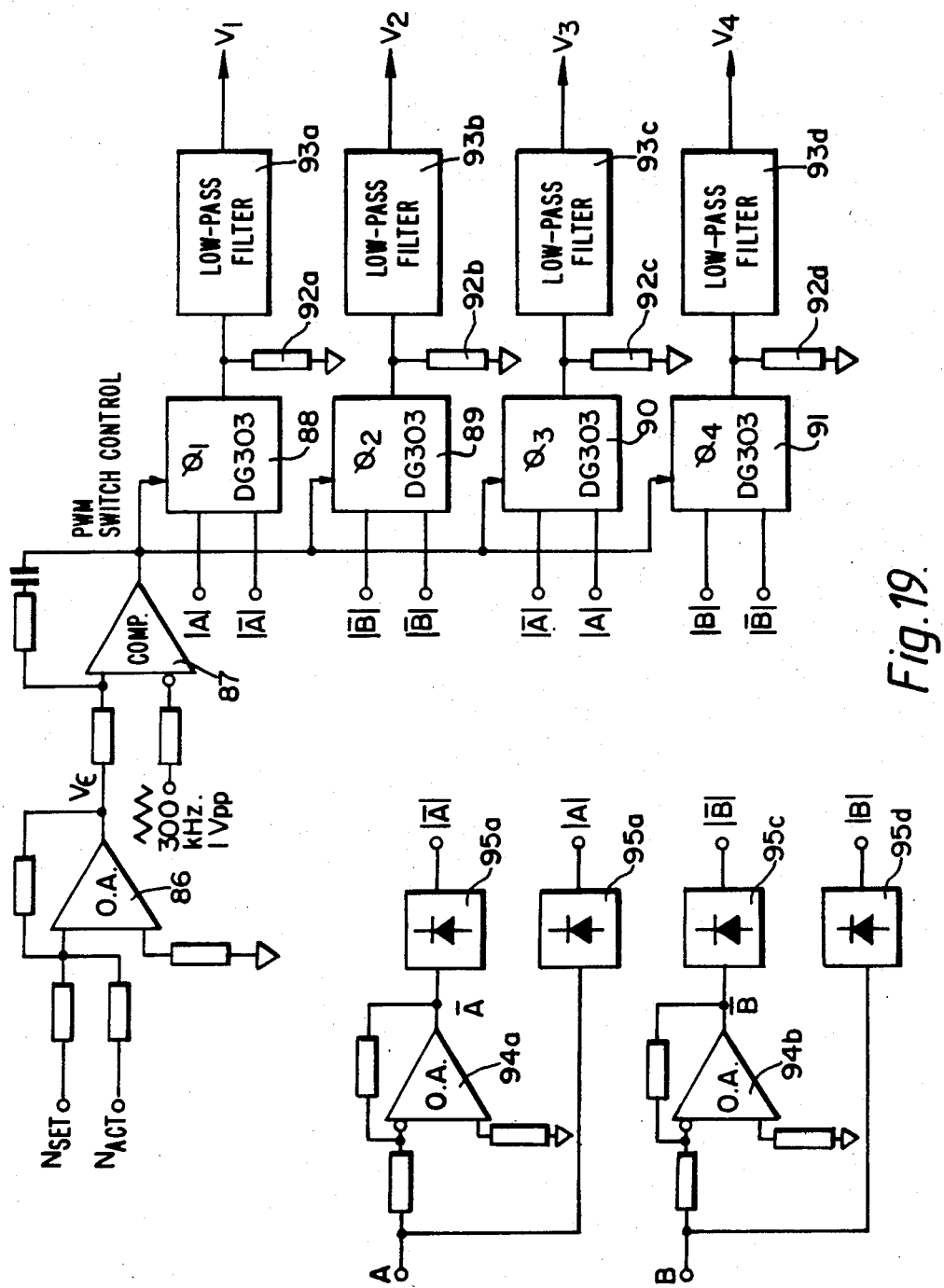
FIG. 19 shows a first portion of an analog servo adaptation of the control system according to the invention, including a velocity-loop amplifier and an associated comparator/switch circuit for control of torque direction.

The velocity-loop amplifier 86 shown in FIG. 19 compares the set-speed voltage to a voltage proportional to the actual motor speed and multiplies it by a very large gain to produce the velocity loop error voltage as in all conventional servosystems. This error voltage is then used to control the torque direction by means of the comparator/analogue switch circuit 87 shown also in FIG. 19. The velocity loop error voltage, $V_e$, is compared to a very high frequency (300 kHz), low amplitude (1 V pp) triangular waveform. The output of this circuit is either completely high or completely low for inputs greater than 1.0 V, giving either all positive or all negative torque as required. In these cases, the overall motor torque is controlled by the absolute value/offset buffer stage to be described in relation to a subsequent Figure. For $|Ve| < 1.0$ V however, the output of the comparator is a very high frequency PWM signal, the pulse width of which is used to control the switching of four analog switches 88, 89, 90, 91, for example, of a single-pole double-throw variety (DG303, Siliconix (Trade Mark)). The outputs of these analog switches, which are pulled low via four pull-down resistors, 92a–92d, are thus analog voltages, which are switched at high frequency from reference voltages to ground. These high frequency PWM analog voltages are filtered by second-order low pass filters 93a–93d, each having an appropriate cutoff frequency, to give the required reference signals as a function of motor shaft position. As the error voltage $V_e$ passes through zero, the reference waveforms from this circuit will also transition smoothly from positive to negative torque currents with a combination of small positive or negative torque currents about $V_e = 0$.

The maximum fundamental frequency of the reference voltage signals A and B applied to the switches 88–91 for a six pole machine will be, $$f_{max} = 6 f_{motor}$$

where
 $f_{motor}$ = Motor speed in Hz
 $f_{max}$ = Frequency of reference currents from transducer.

For a motor speed of 4500 rpm, $f_{max} = 450$ Hz and hence the cutoff frequency of the low-pass filter must be well above this value. It is important that the design of the low-pass filter take account of this in the present system, since no phase shifting of the input signal can be tolerated. If this were to happen, useless counter-torque current could be synthesized, leading to a possibly reduced efficiency of the motor. FIG. 19 also shows the inverters 94a and 94b and the diodes 95a to 95d by which the sine and cosine waves A and B are transformed into the required absolute value reference voltage waveforms $|A|$, $|\overline{A}|$, $|B|$ and $|\overline{B}|$, set out in the table above.

At the outputs from the low-pass filter stage, the basic reference current waveforms must be processed, so that as the velocity-loop error increases or decreases, the demanded current level alters to produce the required torque. This requires, as already described for the earlier embodiments, the multiplication of these output reference voltages by the absolute value of the speed error voltage $|V_e|$, which may be carried out using only operational amplifiers and comparators, as described below.

Figure 20:
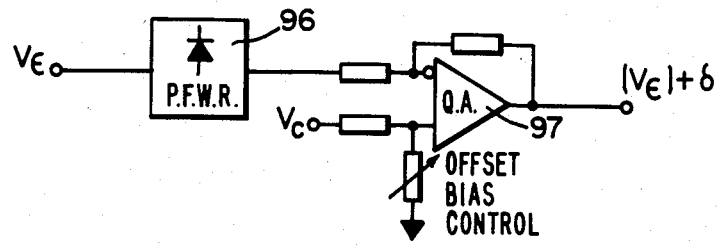
FIG. 20 shows a further portion of the analog embodiment of the servo control system of the invention, in the form of an offset buffer for introducing a bias voltage for low-speed dynamic performance.

Since a reversal of current direction has no effect on the generated torque in a reluctance motor, the absolute value of the error voltage $V_e$ is used to control the overall torque demand in the reluctance motor drive, as now described in regard to FIG. 20. An absolute value circuit 96 is followed by an offset buffer 97. The purpose of the bias circuit is to introduce dither currents in the motor in order to improve the low-speed dynamic performance. This processed error voltage, $$V_e' = |V_e| + d$$

where
 d = offset voltage introduced by the offset buffer,
is then multiplied by the reference current waveshapes to finally produce the demanded current levels in the motor.

Figure 21:
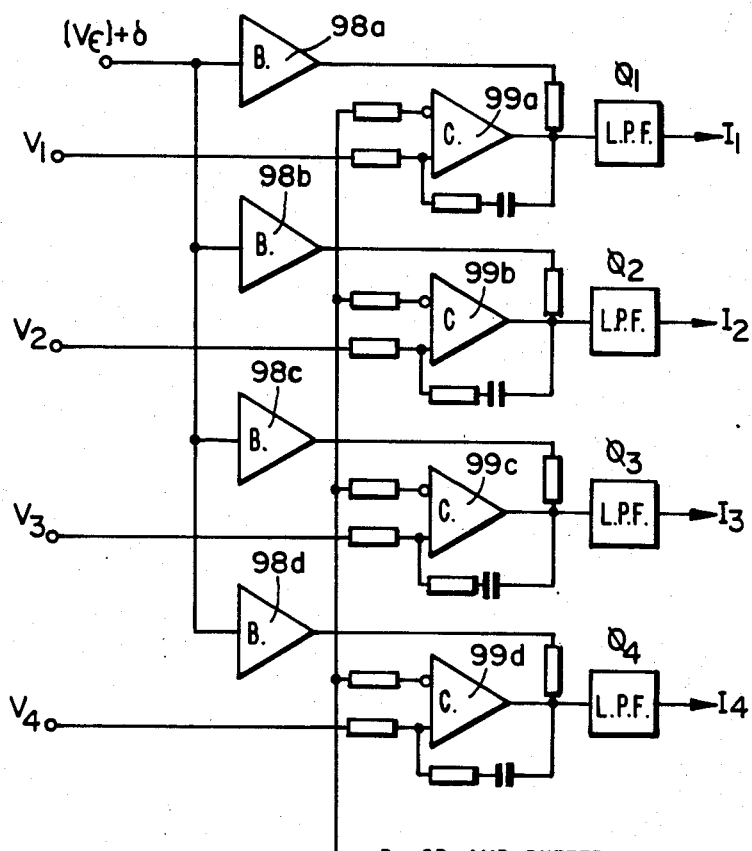
FIG. 21 shows a reference current generator for establishing the final demanded motor current.

In the reference current generation circuit shown in FIG. 21, the reference current waveshapes (inputs $V_1$ to $V_4$) are multiplied by the absolute magnitude of the velocity-loop error voltage to form the final demanded motor phase currents. The rectified and offset error voltage is passed through four high output current, low output impedance, buffers 98a to 98d, each of which feeds the pull-up resistor of a comparator 99a to 99d. The inputs to these comparators are a 10 V pp 300 kHz triangular waveform and the reference current waveforms derived previously. The triangular wave is offset to be unipolar. In this case the comparator transfer function after filtering is $$V_o = (t_{on}/T)/V_{dc}$$

where
 $V_{dc}$ = supply voltage to the comparator pull-up resistor. $t_{on}/T$ is determined by the reference current waveshape,
while the voltage $V_{dc}$ is given by $$V_{dc} = |V_e| + d,$$

the offset absolute speed error voltage. Thus the filtered output of this comparator is proportional to the product of the velocity loop error and the required waveshapes. Therefore the filtered output is appropriate for achieving smooth torque output from the motor and thus the desired set currents in the machine.

The final stage of the controller requires four PWM current loops, as described in regard to the first embodiment, in order to synthesize the servocontroller's reference current waveshapes at the desired current level. There are provided downstream of the low pass filters 100a to 100d of FIG. 21.

In all embodiments of control systems according to the present invention, a fundamental feature is the provision of means for establishing, under standstill conditions, a forward torque which is in substantial equilibrium with a corresponding reverse torque. Accordingly the motor shaft is held against rotation by the opposing torques, and any attempted displacement of it away from the standstill position is answered by the augmentation of either the forward torque or the reverse torque, as appropriate, by the action of the control system. The rotor may only be rotated under standstill conditions if the torque applied to its shaft exceeds the maximum opposing torque which the motor can generate. In similar manner when the motor shaft is rotating, the control system establishes torques in each phase in response to the speed selected and the resistance afforded by the load on the motor. The control system will react appropriately to take account of fluctuating loads, while maintaining the speed substantially constant.

The zero-speed magnetizing current in reluctance motors may typically be of the order of 20% of the rated current. Since in most applications, motors are rarely at standstill for any great length of time, this level of standstill current does not represent a difficulty.

We claim:

1. A control system for a variable reluctance electrical machine having driving member pole windings, comprising power supply means including voltage source means connectible across said driving member pole windings of said machine in a predetermined sequence and for a predetermined increment of displacement of a driven member of the machine and means for regulating the instantaneous magnitude of the current in one of said driving member pole windings when connected to said voltage source means, the control system also comprising driven member position-sensing means for generating at least one signal, the instantaneous value of which is dependent on the position of the driven member, for providing driven member position information at a succession of intervals within each said predetermined increment of driven member displacement during which one of said driving member pole windings is connectible to said voltage source means, said current-regulating means including means for generating relative current magnitudes for each of a plurality of positions of the driven member in accordance with the instantaneous value of said at least one signal of the driven member position-sensing means and means for forcing the instantaneous magnitude of the current in one of said driving member pole windings when connected to said voltage source means to track said relative current magnitudes so that the instantaneous value of said current set by said regulating means at any position of the driven member within said increment of driven member displacement during which the winding is connectible to said voltage source means relative to its value at any other said position is substantially determined by the instantaneous position of the driven member within said increment of driven member displacement, and the system further including means for providing a speed signal, the magnitude of which is indicative of the speed of driven member displacement and the polarity of which is indicative of the direction of driven member displacement, the power supply means including means for combining said speed signal with a speed demand signal to produce a speed error signal of variable magnitude and polarity, said speed error signal defining a direction input of variable polarity which is applied to said relative current magnitude generating means and said generating means being responsive to the polarity of said direction input for selection of current magnitudes appropriate to the direction of driven member displacement as indicated by the polarity of said speed error signal.

2. A control system according to claim 1, wherein said relative current magnitude generating means includes memory means for storing digitized relative current magnitudes for each of a plurality of positions of the driven member and for recall in appropriate sequence in accordance with the instantaneous value of said at least one signal of the driven member position-sensing means and said direction input is applied to said memory means, said memory means being responsive to the polarity of said direction input for recall of digitized current magnitudes appropriate to the direction of driven member displacement as indicated by the polarity of said speed error signal.

3. A control system for a variable reluctance electrical machine having a rotor and a plurality of stator pole windings, said system comprising power supply means including voltage source means connectible across said stator pole windings of said machine in a predetermined sequence and for a predetermined angular increment of rotation of the rotor of the machine and means for regulating the instantaneous magnitude of the current in one of said stator pole windings when connected to said voltage source means, the control system also comprising rotor position-sensing means for generating at least one signal, the instantaneous value of which is dependent on the position of the rotor, and for providing rotor position information at a succession of intervals within each said angular increment of rotor rotation during which one of said stator pole windings is connectible to said voltage source means, said current-regulating means including means for generating relative current magnitudes for each of a plurality of positions of the rotor in accordance with the instantaneous value of said at least one signal of the rotor position-sensing means and means for forcing the instantaneous magnitude of the current in a stator pole winding when connected to said voltage source means to track said relative current magnitudes so that the instantaneous value of said current set by said regulating means at any position of the rotor within said angular increment of rotor rotation during which the winding is connectible to said voltage source means relative to its value at any other said position is substantially determined by the instantaneous position of the rotor within said angular increment of rotor rotation, and the system further including means for providing a speed signal, the magnitude of which is indicative of the speed of rotor rotation and the polarity of which is indicative of the direction of rotor rotation, the power supply means including means for combining said speed signal with a speed demand signal to produce a speed error signal of variable magnitude and polarity, said speed error signal defining a direction input of variable polarity which is applied to said relative current magnitude generating means and said generating means being responsive to the polarity of said direction input for selection of current magnitudes appropriate to the direction of rotor rotation as indicated by the polarity of said speed error signal.

4. A control system according to claim 3, wherein said relative current magnitude generating means includes memory means for storing digitized relative current magnitudes for each of a plurality of positions of the rotor and for recall in appropriate sequence in accordance with the instantaneous value of said at least one signal of the rotor position-sensing means and said direction input is applied to said memory means, said memory means being responsive to the polarity of said direction input for recall of digitized current magnitudes appropriate to the direction of rotor rotation as indicated by the polarity of said speed error signal.

5. A control system according to claim 3, including means for modulating said speed error signal within a predetermined range of magnitudes of said signal so that said direction input is modulated and said relative current magnitude generating means is responsive to said modulated direction input for alternating selection of relative current magnitudes for rotor rotation in opposite directions when said speed error signal is within said predetermined range of magnitudes.

6. A control system according to claim 3, wherein said speed error signal also defines a torque demand signal and said current-magnitude-forcing means is responsive to the magnitude of said torque demand signal to regulate said stator winding current so that the absolute magnitude of said current at every angular position of the rotor within said angular increment of rotor rotation during which the winding is connectible to said voltage source means is substantially determined by the magnitude of said torque demand signal.

7. A control system according to claim 3, wherein the power supply means includes means for combining said speed error signal with a bias signal to define a torque demand signal, and said current-magnitude-forcing means is responsive to the magnitude of said torque demand signal to regulate said stator winding current so that the absolute magnitude of said current at every angular position of the rotor within said angular increment of rotor rotation during which the winding is connectible to said voltage source means is substantially determined by the magnitude of said torque demand signal.

8. A control system according to claim 7, including means for modulating said speed error signal within a predetermined range of magnitudes of said signal so that said direction input is modulated and said relative current magnitude generating means is responsive to said modulated direction input for alternating selection of relative current magnitudes for rotor rotation in opposite directions when said speed error signal is within said predetermined range of magnitudes.

9. A control system according to claim 8, wherein said predetermined range of magnitudes of said speed error signal extends about a zero value of said signal.

10. A drive system comprising a saturable variable reluctance electrical machine, said electrical machine comprising a stationary or driving member having a plurality of salient driving poles, a magnetizing winding for each driving pole, a movable or driven member having a plurality of salient driven poles, the number of driven poles being less than the number of driving poles, and a plurality of airgaps, the airgap between each driving pole and a driven pole positioned in alignment therewith being small relative to the dimensions of the poles transverse to said airgap and at least the driven poles being formed so that in operation of the machine magnetic saturation occurs substantially in a region of the mechanically variable interface or overlap between the driving and driven poles, and the extents and dispositions of the driven poles being related to those of the driving poles so that in operation of the machine, a force-producing increment of driven member displacement resulting from the mechanical interface or overlap of each driven pole with a driving pole overlaps a force-producing increment of driven member displacement resulting from the overlap of another driven pole with a further driving pole, and the system also comprising driven member positioning-sensing means for generating at least one signal, the instantaneous value of which is dependent on the position of the driven member, and for providing driven member position information at a succession of intervals within a predetermined increment of driven member displacement during which a driving pole winding is connectible to a voltage source means, and power supply means including said voltage source means connectible across the driving pole windings, said windings being connectible across said voltage source means in a predetermined sequence during driven member displacement and each driving pole winding being thus connectible for a predetermined increment of driven member displacement, the power supply means including means for regulating the instantaneous magnitude of the current in one of said driving member windings when connected to said voltage source means, said current-regulating means including means for generating relative current magnitudes for each of a plurality of positions of the driven member in accordance with the instantaneous value of said at least one signal of the driven member position-sensing means and means for forcing the instantaneous magnitude of the current in one of said driving pole windings when connected to said voltage source means to track said relative current magnitudes so that the instantaneous value of said current set by said regulating means at any position of the driven member within said increment of driven member displacement during which the winding is connectible to said voltage source means relative to its value at any other said position is substantially determined by the instantaneous position of the driven member within said increment of driven member displacement, and the system further including means for providing a speed signal, the magnitude of which is indicative of the speed of driven member displacement and the polarity of which is indicative of the direction of driven member displacement, the power supply means including means for combining said speed signal with a speed demand signal to produce a speed error signal of variable magnitude and polarity, said speed error signal defining a direction input of variable polarity which is applied to said relative current magnitude-generating means and said generating means being responsive to the polarity of said direction input for selection of current magnitudes appropriate to the direction of driven member displacement as indicated by the polarity of said speed error signal.

11. A drive system comprising a saturable variable reluctance electrical machine, said electrical machine comprising a stator having a plurality of salient stator poles, a magnetizing winding for each stator pole, a rotor having a plurality of salient rotor poles, the number of rotor poles being less than the number of stator poles, a radial airgap between each stator pole and a rotor pole positioned in alignment therewith being small relative to the dimensions of the poles transverse to said airgap and at least the rotor poles being formed so that in operation of the machine magnetic saturation occurs substantially in a region of the mechanically variable interface or overlap between the stator and the rotor poles, and the arcuate extents and dispositions of the rotor poles being related to those of the stator poles so that in operation of the machine, a torque-producing angular increment of rotor rotation resulting from the mechanical interface or overlap of each rotor pole with a stator pole overlaps a torque-producing angular increment of rotor rotation resulting from the overlap of another rotor pole with a further stator pole, and the system also comprising rotor position-sensing means for generating at least one signal, the instantaneous value of which is dependent on the position of the rotor, and for providing rotor position information at a succession of intervals within a predetermined angular increment of rotor rotation during which a stator pole winding is connectible to a voltage source means, and power supply means including said voltage source means connectible across the stator pole windings, said windings being connectible across said voltage source means in a predetermined sequence during rotor rotation and each stator pole winding being thus connectible for said predetermined angular increment of rotor rotation, the power supply means including means for regulating the instantaneous magnitude of the current in a stator pole winding when connected to said voltage source means, said current-regulating means including means for generating relative current magnitudes for each of a plurality of positions of the rotor in accordance with the instantaneous value of said at least one signal of the rotor position-sensing means and means for forcing the instantaneous magnitude of the current in one of said stator pole windings when connected to said voltage source means to track said relative current magnitudes so that the instantaneous value of said current set by said regulating means at any position of the rotor within said angular increment of rotor rotation during which the winding is connectible to said voltage source means relative to its value at any other said position is substantially determined by the instantaneous position of the rotor within said angular increment of rotor rotation, and the system further including means for providing a speed signal, the magnitude of which is indicative of the speed of rotor rotation and the polarity of which is indicative of the direction of rotor rotation, the power supply means including means for combining said speed signal with a speed demand signal to produce a speed error signal of variable magnitude and polarity, said speed error signal defining a direction input of variable polarity which is applied to said relative current magnitude generating means and said generating means being responsive to the polarity of said direction input for recall of relative current magnitudes appropriate to the direction of rotor rotation as indicated by the polarity of said speed error signal.

12. A drive system according to claim 11, wherein said relative current magnitude generating means includes memory means for storing digitized relative current magnitudes for each of a plurality of positions of the rotor and for recall in appropriate sequence in accordance with the instantaneous value of said at least one signal of the rotor position-sensing means and said direction input is applied to said memory means, said memory means being responsive to the polarity of said direction input for recall of digitized current magnitudes appropriate to the direction of rotor rotation as indicated by the polarity of said speed error signal.

13. A drive system according to claim 11, including means for modulating said speed error signal within a predetermined range of magnitudes of said signal so that said direction input is modulated and said relative current magnitude generating means is responsive to said modulated direction input for alternating selection of relative current magnitudes for rotor rotation in opposite directions when said error signal is within said predetermined range of magnitudes.

14. A control system according to claim 13, wherein said predetermined range of magnitudes of said speed error signal extends about a zero value of said signal.

15. A drive system according to claim 13, wherein said predetermined range of magnitudes of said speed error signal extends about a zero value of said signal.

16. A drive system according to claim 11, wherein said speed error signal also defines a torque demand signal and said current-magnitude-forcing means is responsive to the magnitude of said torque demand signal to regulate said stator winding current so that the absolute magnitude of said current at every angular position of the rotor within said angular increment of rotor rotation during which the winding is connectible to said voltage source means is substantially determined by the magnitude of said torgue demand signal.

17. A drive system according to claim 11, wherein the power supply means includes means for combining said speed error signal with a bias signal to define a torque demand signal and said current-magnitude-forcing means is responsive to the magnitude of said torque demand signal to regulate said stator winding current so that the absolute magnitude of said current at every angular position of the rotor within said angular increment of rotor rotation during which the winding is connectible to said voltage source means is substantially determined by the magnitude of said torque demand signal.

18. A drive system according to claim 17, including means for modulating said speed error signal within a predetermined range of magnitudes of said signal so that said direction input is modulated and said relative current magnitude generating means is responsive to said modulated direction input for alternating selection of relative current magnitudes for rotor rotation in opposite directions when said speed error signal is within said predetermined range of magnitudes.

19. A drive system according to claim 18, wherein said predetermined range of magnitudes of said speed error signal extends about a zero value of said signal.

20. A drive system comprising a saturable variable reluctance electrical machine, said electrical machine comprising a stationary or driving member having a plurality of salient driving poles, a magnetizing winding for each driving pole, a movable or driven member having a plurality of salient driven poles, the number of driven poles being less than the number of driving poles, and a plurality of airgaps, the airgap between each driving pole and a driven pole positioned in alignment therewith being small relative to the dimensions of the poles transverse to said airgap and at least the driven poles being formed so that in operation of the machine, magnetic saturation occurs substantially in a region of the mechanically variable interface or overlap between the driving and driven poles, and the extents and dispositions of the driven poles being related to those of the driving poles so that in operation of the machine, a force-producing increment of driven member displacement resulting from the mechanical interface or overlap of each driven pole with a driving pole overlaps a force-producing increment of driven member displacement resulting from the overlap of another driven pole with a further driving pole, and the system also comprising power supply means including voltage source means connectible across the driving pole windings, said windings being connectible across said voltage source means in a predetermined sequence during driven member displacement and each driving pole winding being thus connectible for a predetermined increment of driven member displacement, and driven member positioning-sensing means for generating at least one signal, the instantaneous value of which is dependent on the position of the driven member, for providing driven member position information at a succession of intervals within each said predetermined increment of driven member displacement during which a driving pole winding is connectible to said voltage source means, the power supply means also including means for regulating the instantaneous magnitude of the current in a driving member winding when connected to said voltage source means, said current-regulating means including memory means for storing digitized relative current magnitudes for each of a plurality of positions of the driven member and for recall in appropriate sequence in accordance with the instantaneous value of said at least one signal of the driven member position-sensing means and means for forcing the instantaneous magnitude of the current in a driving pole winding when connected to said voltage source means to track said relative current magnitudes so that the instantaneous value of said current set by said regulating means at any position of the driven member within said increment of driven member displacement during which the winding is connectible to said voltage source means relative to its value at any other said position is substantially determined by the instantaneous position of the driven member within said increment of driven member displacement.

21. A drive system comprising a saturable variable reluctance electrical machine, said electrical machine comprising a stator having a plurality of salient stator poles, a magnetizing winding for each stator pole, a rotor having a plurality of salient rotor poles, the number of rotor poles being less than the number of stator poles, a radial airgap between each stator pole and a rotor pole positioned in alignment therewith being small relative to the dimensions of the poles transverse to said airgap and at least the rotor poles being formed so that in operation of the machine magnetic saturation occurs substantially in a region of the mechanically variable interface or overlap between the stator and rotor poles, and the arcuate extents and dispositions of the rotor poles being related to those of the stator poles so that in operation of the machine, a torque-producing angular increment of rotor rotation resulting from the mechanical interface or overlap of each rotor pole with a stator pole overlaps a torque-producing angular increment of rotor rotation resulting from the overlap of another rotor pole with a further stator pole, and the system also comprising power supply means including voltage source means connectible across the stator pole windings, said windings being connectible across said voltage source means in a predetermined sequence during rotor rotation and each stator pole winding being thus connectible for a predetermined angular increment or rotor rotation, and rotor positioning-sensing means for generating at least one signal, the instantaneous value of which is dependent on the position of the rotor, and for providing rotor position information at a succession of intervals within each said predetermined angular increment of rotor rotation during which a stator pole winding is connectible to said voltage source means, the power supply means also including means for regulating the instantaneous magnitude of the current in a stator winding when connected to said voltage source means, said current-regulating means including memory means for storing digitized relative current magnitudes for each of a plurality of positions of the rotor and for recall in appropriate sequence in accordance with the instantaneous value of said at least one signal of the rotor position-sensing means and means for forcing the instantaneous magnitude of the current in a stator pole winding when connected to said voltage source means to track said relative current magnitudes so that the instantaneous value of said current set by said regulating means at any angular position of the rotor within said angular increment of rotor rotation during which the winding is connectible to said voltage source means relative to its value at any other said angular position is substantially determined by the instantaneous angular position of the rotor within said angular increment.

22. A drive system according to claim 21, further comprising means for producing a demand signal, the value of which is indicative of a desired level of a parameter of machine performance, said current-regulating means being responsive to said parameter-level-indicative signal to regulate said stator winding current so that the absolute magnitude of said current at every angular position of the rotor within said angular increment of rotor rotation during which the winding is connectible to said voltage souce means is substantially determined by the value of said parameter-level-indicative signal.

23. A drive system according to claim 21, including means for providing a speed signal, the magnitude of which is indicative of the speed of rotor rotation and the polarity of which is indicative of the direction of rotor rotation, wherein the power supply means includes means for combining said speed signal with a speed demand signal to produce a speed error signal of variable magnitude and polarity, said speed error signal defining a torque demand signal and said current-magnitude-forcing means being responsive to the magnitude of said torque demand signal to regulate said stator winding current so that the absolute magnitude of said current at every angular position of the rotor within said angular increment of rotor rotation during which the winding is connectible to said voltage source means is substantially determined by the magnitude of said torque demand signal.

24. A drive system according to claim 23, wherein said speed error signal also defines a direction input which is applied to said memory means and said memory means is responsive to the polarity of said direction input for recall of digitized current magnitudes appropriate to the direction of rotor rotation as indicated by the polarity of said speed error signal.

25. A drive system according to claim 24, including means for modulating said speed error signal within a predetermined range of magnitudes of said signal so that said direction input is modulated and said memory means is addressed for alternating selection of digitized current magnitudes for rotor rotation in opposite directions when said speed error signal is within said predetermined range of magnitudes.

26. A drive system according to claim 25, wherein said predetermined range of magnitudes of said speed error signal extends about a zero value of said signal.

27. A drive system according to claim 21, including means for providing a speed signal, the magnitude of which is indicative of the speed of rotor rotation and the polarity of which is indicative of the direction of rotor rotation, wherein the power supply means includes means for combining said speed signal with a speed demand signal to produce a speed error signal of variable magnitude and polarity and means for combining said speed error signal with a bias signal to define a torque demand signal, said current-magnitude-forcing means being responsive to the magnitude of said torque demand signal to regulate said stator winding current so that the absolute magnitude of said current at every angular position of the rotor within said angular increment of rotor rotation during which the winding is connectible to said voltage source means is substantially determined by the magnitude of said torque demand signal.

28. A drive system according to claim 27, wherin said speed error signal also defines a direction input which is applied to said memory means and said memory means is responsive to the polarity of said direction input for recall of digitized current magnitudes appropriate to the direction of rotor rotation as indicated by the polarity of said speed error signal.

29. A drive system according to claim 28, including means for modulating said speed error signal within a predetermined range of magnitudes of said signal so that said direction input is modulated and said memory means is addressed for alternating selection of digitized current magnitudes for rotor rotation in opposite directions when said speed error signal is within said predetermined range of magnitudes.

30. A drive system according to claim 29, wherein said predetermined range of magnitudes of said speed error signal extends about a zero value of said signal.

* * * * *